(12) United States Patent
Momose et al.

(10) Patent No.: US 7,055,966 B2
(45) Date of Patent: Jun. 6, 2006

(54) ILLUMINATOR AND PROJECTOR

(75) Inventors: Akira Momose, Shiojiri (JP); Atsushi Miyazawa, Suwa (JP); Keijiro Naito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 10/682,824

(22) Filed: Oct. 10, 2003

(65) Prior Publication Data

US 2005/0068505 A1 Mar. 31, 2005

(30) Foreign Application Priority Data

| Oct. 11, 2002 | (JP) | ............................. 2002-298984 |
| Feb. 13, 2003 | (JP) | ............................. 2003-035524 |
| Sep. 17, 2003 | (JP) | ............................. 2003-324342 |

(51) Int. Cl.
| G03B 21/14 | (2006.01) |
| G03B 21/16 | (2006.01) |
| G03B 21/20 | (2006.01) |
| G03B 21/26 | (2006.01) |
| G02B 26/02 | (2006.01) |
| F21V 1/03 | (2006.01) |
| H04N 5/74 | (2006.01) |

(52) U.S. Cl. ........................... 353/97; 353/86; 353/102; 353/52; 353/34; 362/290; 362/325; 362/352; 362/354; 359/232; 359/236; 359/583; 359/629; 349/8; 349/66; 348/750; 348/757; 348/759; 348/771

(58) Field of Classification Search ............... 353/97, 353/85, 87, 100, 101, 20, 98, 99, 102, 34, 353/52, 81, 82, 86, 91, 93; 362/257, 290, 362/319, 325, 341, 346, 352, 354; 349/5, 349/110, 9, 8, 62, 66; 345/63, 101, 108, 345/109, 690; 359/483, 232, 233, 234, 236, 359/577, 583, 618, 629; 348/744, 750, 757, 348/758, 759, 771

See application file for complete search history.

(56) References Cited

U.S. PATENT DOCUMENTS

| 4,248,517 A | * | 2/1981 | Nishikawa ..................... 355/1 |
| 5,502,581 A | * | 3/1996 | Sudo et al. ................... 359/10 |
| 2001/0015775 A1 | * | 8/2001 | Yamamoto et al. ............ 349/5 |
| 2002/0105621 A1 | * | 8/2002 | Kurematsu .................. 353/30 |
| 2003/0086265 A1 | * | 5/2003 | Ilsaka et al. ................. 362/268 |

FOREIGN PATENT DOCUMENTS

| JP | 5-66501 | 3/1993 |
| JP | 2002-23106 | 1/2002 |

* cited by examiner

*Primary Examiner*—W. B. Perkey
*Assistant Examiner*—Rochelle Blackman
(74) *Attorney, Agent, or Firm*—Oliff & Berridge, PLC

(57) ABSTRACT

When a video signal is inputted to a projector (10) through a video input terminal, a luminance peak value of an image of the video signal is detected by an image-analyzing circuit (61) to be outputted to a CPU (71). A gain-adjusting circuit (63) adjusts a luminance signal in the video signal based on a command from the CPU (71). The CPU (71) determines a gain adjustment amount based on the luminance peak value of the image obtained by the image-analyzing circuit (61) and outputs the result to the gain-adjusting circuit (63). For instance, when the luminance peak value (Ip) of the image is 50% of the upper limit (Imax) thereof, a gain-adjusting amount AG is doubled. In this case, an illuminating light volume of a light valve (44a) has to be reduced to 50%, which is achieved by light-attenuation by a light-source lamp (21) and an open/close light shield (23).

24 Claims, 14 Drawing Sheets

ILLUMINATOR AND PROJECTOR

BACKGROUND OF THE INVENTION

1. Technical Field of the Invention

The present invention relates to an illuminator and a projector using the illuminator.

2. Description of Related Art

An effort has been made to enhance the contrast of an image of a projector by controlling an emitting light volume of a metal halide lamp, i.e. a light source, in accordance with the average illuminance of the image (see Japanese Patent Laid-Open Publication No. Hei 5-66501).

Alternatively, instead of varying the emitting light volume of the light source, the light volume is adjusted by an optical lens stop to enhance the contrast of the image (see Japanese Patent Laid-Open Publication No. 2002-23106).

However, the majority of projectors nowadays use a high-pressure mercury lamp as the light source. When the emitting light volume of such a high-pressure mercury lamp is adjusted in the same manner as described in the Japanese Patent Laid-Open Publication No. Hei 5-66501, the 100% emitting light volume can be attenuated only to approximately 70% and, consequently, the contrast of the image cannot be sufficiently enhanced.

On the other hand, when the light from the light source is extremely attenuated using the optical lens stop shown in the Japanese Patent Laid-Open Publication No. 2002-23106, a heat is generated and concentrated on the optical lens stop, which can exert undesirable influence on the adjacent optical components or the like.

Further, when the optical lens stop is used to extremely attenuate the light from the light source to 30 to 40%, unevenness of illumination may become prominent on account of minute errors in disposition of the components such as a lamp, a light shield and an integrator, which may cause serious illumination unevenness by exchanging the lamp etc.

SUMMARY OF THE INVENTION

An object of the present invention is to provide an illuminator capable of enhancing the contrast of an image even when a lamp such as a high-pressure mercury lamp with little variation in illuminating light volume is used, and a projector having the illuminator.

Another object of the present invention is to provide an illuminator that is scarcely influenced by the heat generated when the intensity of the illumination light is adjusted over a wide range and is unlikely to cause illumination unevenness.

An illuminator according to an aspect of the present invention includes: an illuminating light source; a light source driver that adjusts an emitting light volume of the light source; and a light shield that adjusts an intensity of an illumination light taken out from the light source.

According to the above illuminator, since the light source driver adjusts the emitting light volume of the light source and the light shield adjusts the intensity of the illumination light taken out from the light source, the luminance of the illumination light can be adjusted beyond the adjustable range of the emitting light volume of the light source. Further, as compared to an arrangement for adjusting the intensity of the illumination light solely by the light shield, the heat generated by the light shield and power consumption of the light source can be reduced.

In a specific arrangement of the illuminator, the light shield may preferably be an optical modulator that partially transmits the illumination light irradiated by the light source. According to the above arrangement, the light volume can be accurately adjusted by an electrical control.

In another specific arrangement of the illuminator, the light shield may preferably be an optical lens stop that partially shields the illumination light irradiated by the light source. According to the above arrangement, the light volume can be accurately adjusted with a simple mechanism.

In still another specific arrangement of the illuminator, the optical lens stop may preferably include: a plurality of light-shielding masks having an opening that transmits the illumination light from the light source and a light-shielding portion that shields a part of the illumination light from the light source; and a light-shielding mask moving mechanism that is capable of relatively moving the plurality of light-shielding masks so that the opening and the light-shielding portion are superposed in an irradiating direction of the illumination light from the light source. According to the above arrangement, the structure of the optical lens stop can be simplified, so that the opening and the light-shielding portion can be superposed in the irradiating direction of the illumination light from the light source only by relative slide movement of the plurality of light-shielding masks, thus easily and rapidly adjusting the light volume by the optical lens stop. Incidentally, though there is no specific limitation for the light-shielding mask, the light-shielding mask may have a latticed arrangement of the openings and the light-shielding portions or concentric circle arrangement of the opening, and the light-shielding portions.

In a further specific arrangement of the illuminator, the light-shielding mask moving mechanism preferably has a shaft extending in a first direction orthogonal to an illumination optical axis of the illumination light from the light source and rotating around an axis in the first direction, and a plurality of movable portions that moves in the first direction in accordance with the rotation of the shaft, and the plurality of movable portions preferably are engaged with the plurality of light-shielding masks and moves in the first direction in accordance with the rotation of the shaft to cause relative movement of the plurality of light-shielding masks. According to the above arrangement, the plurality of shielding masks can be relatively moved only by rotating the shaft, so that the structure of the light-shielding mask moving mechanism can be simplified. Further, since the rotation angle of the shaft and the relative displacement of the plurality of light-shielding masks are mutually related, the light volume can be easily and highly accurately adjusted by the optical lens stop by accurately controlling the rotation angle of the shaft.

In still further specific arrangement of the illuminator, the optical lens stop preferably has a movable portion biasing member that biases the plurality of movable portions in the first direction to be away from each other. For instance, when the plurality of movable portions are screwed to the shaft and are movable by the screwing rotation of the shaft, the movable portion biasing member biases the plurality of movable portions in the first direction to be away from each other, the shift in screwed condition of the shaft and the plurality of movable portions caused by the clearance of the screw groove can be prevented and the light volume can be accurately adjusted by the optical lens stop.

In still further specific arrangement of the illuminator, an optical modulator driver that drives the optical modulator or a lens-stop driver that drives the optical lens stop is further provided. According to the above arrangement, since the optical modulator driver or the lens-stop driver is provided, the light volume can be accurately adjusted by electronically controlling the optical modulator or the optical lens stop.

In still further specific arrangement of the illuminator, the lens-stop driver is preferably a motor. According to the above arrangement, the lens-stop driver can be constructed by various general-type motors and the appropriate component can be selected in accordance with the design of the illuminator.

In still further specific arrangement of the illuminator, a motor-shaft biasing member that biases a motor shaft of the motor in an axial direction of the motor shaft is preferably provided. According to the above arrangement, even when the motor shaft of the motor can cause position shift in axial direction, the motor shaft is biased in the axial direction by the motor-shaft biasing member, thus preventing the position shift of the motor shaft, in other words, accurately adjusting the light volume by the optical lens t.

In still further specific arrangement of the illuminator, the lens-stop driver is preferably driven by an electromagnet. According to the above arrangement, the optical lens stop may be driven by, for instance, changing magnetic pole of the electromagnetic. Accordingly, the optical lens stop can be driven with a simple structure with high speed, thereby rapidly adjusting the light volume by the optical lens stop.

In still further specific arrangement of the illuminator, the light shield preferably changes a transmissive light volume in a staged manner. According to the above arrangement, since it is not necessary to control the light shield with minute adjustment, the light shield can be driven with a simple structure.

In still further specific arrangement of the illuminator, the light shield is preferably driven in two stages to vary a transmissive light volume. According to the above arrangement, the response speed of the optical lens stop can be easily made constant and the light volume can be easily adjusted by the optical lens stop with low cost.

In still further specific arrangement of the illuminator, an attachment for the light shield at a predetermined position relative to the light shield is preferably provided, and the attachment is preferably capable of adjusting the position of the light shield within a plane orthogonal to an illumination optical axis of the illumination light from the light source. According to the above arrangement, even when there is a design error in the light shield and the illumination light cannot be shielded with a designed illumination intensity by the light shield, the position of the light shield can be changed by adjusting the position of the attachment, thereby obtaining designed illumination intensity.

In still further specific arrangement of the illuminator, the light shield preferably partially shields a light beam irradiated by the light source from a side near a conjugate position of the light source. According to the above arrangement, the light can be shielded by the light shield near the conjugate position of the light source, thereby reducing illumination unevenness of the light beam irradiated by the illuminator.

In still further specific arrangement of the illuminator, a light-beam separator that includes a light-beam separating element that separates the illumination light from the light source and a light condenser that condenses a plurality of light beams separated by the light-beam separating element are preferably provided, and the light shield is preferably disposed between the light-beam separating element and the light condenser. When the above light-beam separator is provided, a predetermined gap is formed between the light-beam separating element and the light condenser in accordance with the optical characteristics of the light-beam separating element and the light condenser. By disposing the light shield at the gap, the size of the illuminator can be reduced and the size reduction of the illuminator can be achieved.

In still further specific arrangement of the illuminator, the light source driver preferably continuously changes the emitting light volume of the light source. According to the above arrangement, the contrast can be smoothly changed in accordance with the change in the luminance of the image.

In still further specific arrangement of the illuminator, a controller that drives the light source driver in conjunction with the light shield is preferably provided. According to the above arrangement, the luminance of the illumination light can be adjusted in accordance with the characteristics of the light source and the light shield.

In still further specific arrangement of the illuminator, the controller preferably has: an allocation table storing an information on a combination of the emitting light volume of the light source for a given illuminating light volume and a light shielding parameter corresponding to an adjustment amount by the light shield; and a judging portion that determines which combination in the allocation table is used. According to the above arrangement, the most appropriate drive amount of the light source driver and the light shield corresponding to the light-attenuation amount to be obtained can be rapidly obtained in accordance with the used condition of the illuminator and the like.

In still further specific arrangement of the illuminator, the judging portion preferably switches standards of judgment with regard to which combination in the allocation table is used based on the temperature of the light source. According to the above arrangement, the light source can be efficiently and stably driven.

In still further specific arrangement of the illuminator, the light shield is preferably an optical lens stop that partially shields the illumination light from the light source, and the controller preferably drives the optical lens stop within range of a predetermined adjustment amount of six or less stages of the optical lens stop. According to the above arrangement, accurate operation of the optical lens stop can be achieved only by directly driving the optical lens stop with an inexpensive stepping motor.

In still further specific arrangement of the illuminator, the predetermined adjustment amount is preferably set at a range having gentle inclination on a curve of a graph representing the light shielding parameter corresponding to a drive amount of the optical lens stop and an adjustment amount of the optical lens stop. According to the above arrangement, wide tolerance range can be set for the error of the drive amount of the optical lens stop, thus achieving accurate contrast adjustment.

In still further specific arrangement of the illuminator, the controller preferably gives priority to a decrease in the emitting light volume of the light source by the light source driver over a decrease in the illumination light by the light shield. According to the above arrangement, the heat generated by the light source and the light shield can be reduced.

In still further specific arrangement of the illuminator, a temperature sensor that measures the temperature of the light source is preferably provided, and the controller preferably gives priority to a decrease in the illumination light by the light shield over a decrease in the emitting light volume of the light source by the light source driver when the temperature of the light source is below a predetermined temperature. According to the above arrangement, the light source can be stably driven while keeping the temperature of the light source above a predetermined level.

A projector according to another aspect of the present invention has: the above-described illuminator, an optical modulator illuminated by the illuminator; and a projection lens that projects an image on the optical modulator on an object. According to the above arrangement, since the luminance of the illumination light can be stably adjusted over a wide range for various light sources, the contrast of the projected image is enhanced and expressiveness of a dark portion can be improved.

Another projector according to still another aspect of the present invention has: the above-described illuminator, a plurality of optical modulators illuminated by the illuminator; a combining optical system that combines images on the plurality of optical modulators; and a projection lens that projects the images on the plurality of optical modulators combined by the combining optical system on an object. Also according to the above arrangement, since the luminance of the illumination light can be stably adjusted over a wide range for various light sources, the contrast of the projected image is enhanced and expressiveness of a dark portion can be improved.

DETAILED DESCRIPTION OF PREFERRED EMBODIMENT(S)

First Embodiment A projector installed with an illuminator according to a first embodiment of the present invention will be described below.

Figure 1:
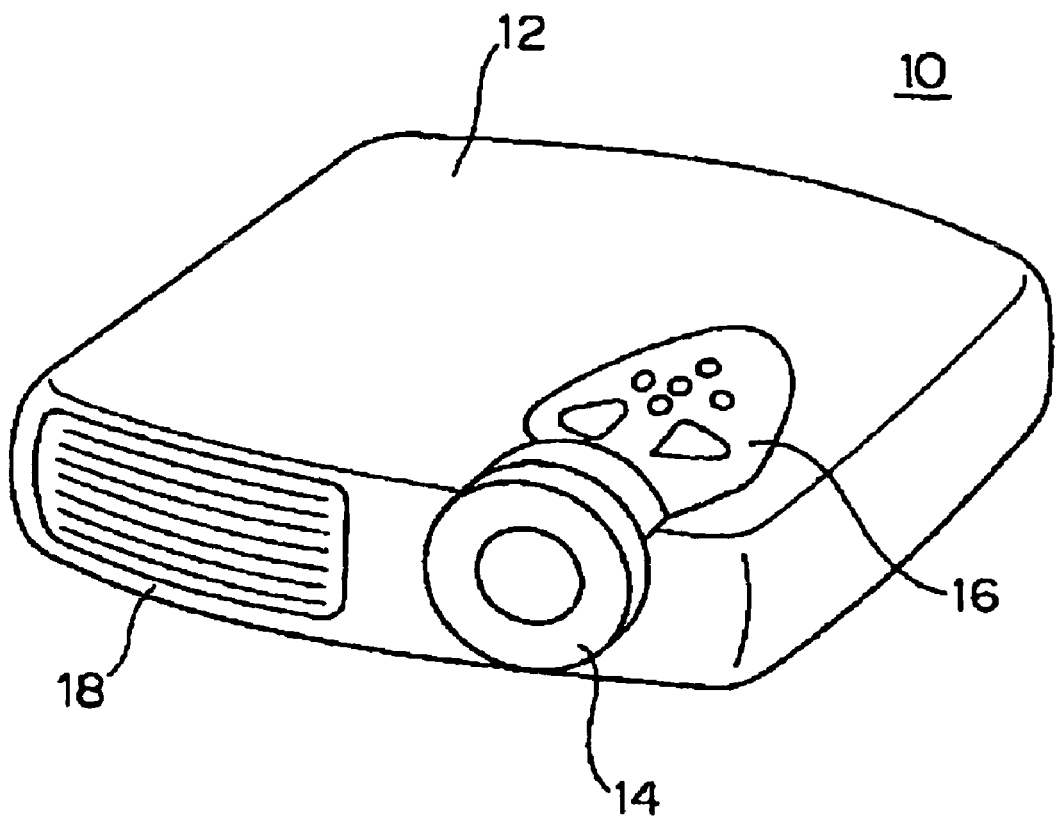
FIG. 1 is a perspective view showing an exterior of a projector according to a first embodiment of the present invention.

FIG. 1 is a perspective view showing an exterior of a projector 10, which has a rectangular parallelepiped casing 12 with a projection lens 14 being buried on the front side thereof. A console 16 for a user is formed on the upper side adjacent to the projection lens 14 and connectors (not shown) are formed on the rear side. Incidentally, a latticed ventilation hole 18 is formed on the front side from which the projection lens 14 is projected adjacent to the projection lens 14.

Figure 2:
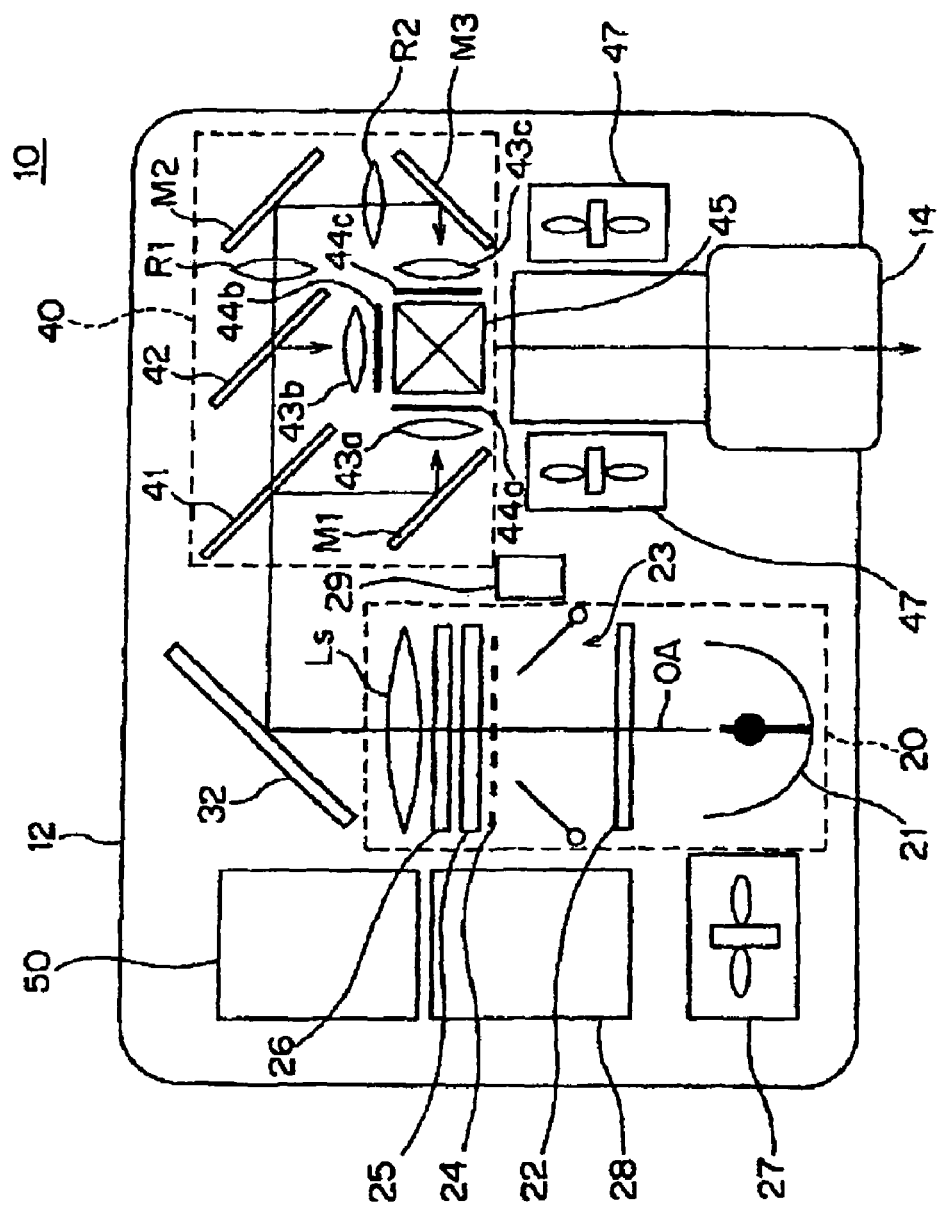
FIG. 2 is an illustration showing an interior of the projector shown in FIG. 1.

FIG. 2 is a plan view showing an interior of the projector 10, which mainly shows an arrangement of an optical system. The projector 10 has, in addition to the projection lens 14 shown in FIG. 1, an illuminator optical system 20 and a color separating/modulating optical system 40 as main components. Incidentally, though not illustrated, a circuit board installing primary circuits and various drive circuits and the like are disposed in a manner to be superposed on the optical systems 14, 20 and 40.

The illuminator optical system 20 has a light-source lamp 21, a first fly's eye lens 22 (i.e. a light-beam separating element), an open/close light shield 23, a slitted light shield 24, a second fly's eye lens 25 (i.e. a light condenser), a polarizer 26, and a superposing lens Ls. The light-source lamp 21 is a high-pressure mercury lamp having a collimating concave mirror, which can minutely adjust an emitting light volume thereof within 100% to approximately 70% range. The first fly's eye lens 22 separates the light from the light-source lamp 21 by a plurality of component lenses arranged in a matrix that individually condenses the separated lights. The open/close light shield 23 is an optical lens stop composed of a pair of rectangular light-shielding plates, in which the light-shielding plates are synchronously opened/closed by the same angle relative to an optical axis OA to shield the illumination light irradiated by the first fly's eye lens 22 within the range of 100% to approximately 50% intensity. The slitted light shield 24 prevents stray lights and is disposed on the boundaries of the respective component lenses of the second fly's eye lens 25 allowing the space for the optical path. The second fly's eye lens 25 has a plurality of component lenses arranged in a matrix, the component lenses forming a uniform diverging lights from the respective secondary light sources formed by the first fly's eye lens 22 to irradiate a uniform illumination light superposed on a below-described light valve (optical modulator). In other words, a light separator according to the present invention corresponds to the first fly's eye lens 22 and the second fly's eye lens 25. The polarizer 26 converts the illumination light irradiated by the second fly's eye lens 25 into a polarization having predetermined polarizing direction and sends the polarized light to a downstream optical system. The superposing lens Ls converges the illumination light passing through the polarizer 26 to allow the illumination light to be superposed on the light valve of the color separating/modulating optical system 40.

On the downstream of the illuminator optical system 20, a mirror 32 for bending the optical axis of the light irradiated by the illuminator optical system 20 toward the color separating/modulating optical system 40 is provided.

The color separating/modulating optical system 40 has a first and a second dichroic mirrors 41 and 42, three field lenses 43a to 43c, three light valves 44a to 44c and a cross dichroic prism 45. A first color light reflected by the first dichroic mirror 41 is incident on the light valve 44a through a reflection mirror M1 and the field lens 43a. A second color light transmitting through the first dichroic mirror 41 and reflected by the second dichroic mirror 42 is incident on the light valve 44b through the field lens 43b. A third color light transmitted through the first and the second dichroic mirrors 41 and 42 is incident on the light valve 44c through a relay lens R1, a reflection mirror M2, a relay lens R2, a reflection mirror M3 and the field lens 43c. The three color lights respectively incident on the respective light valves 44a to 44c are respectively modulated by the light valves 44a to 44c and subsequently are combined by the cross dichroic prism 45 (i.e. a combining optical system) to be irradiated from a side thereof. The combined light irradiated by the cross dichroic prism 45 is incident on the projection lens 14. Incidentally, by passing through the projection lens 14, the image light irradiated by the cross dichroic prism 45 is projected on a screen (not shown) provided outside the projector 10 at a desired magnification.

Other components of the illuminator, including an air-cooling device 27 having a fan for cooling the light-source lamp 21, a lamp driver 28 for stably driving the light-source lamp 21 while adjusting luminance thereof, and an open/close drive device 29 for opening and closing the open/close light shield 23 at a predetermined timing, are provided inside the casing 12. Further, an air-cooling device 47 having fans for cooling the light valves 44a to 44c of the color separating/modulating optical system 40 and the surroundings thereof and a power source 50 for supplying an electric power for driving the respective components of the projector 10 are provided in the casing 12.

Figure 3:
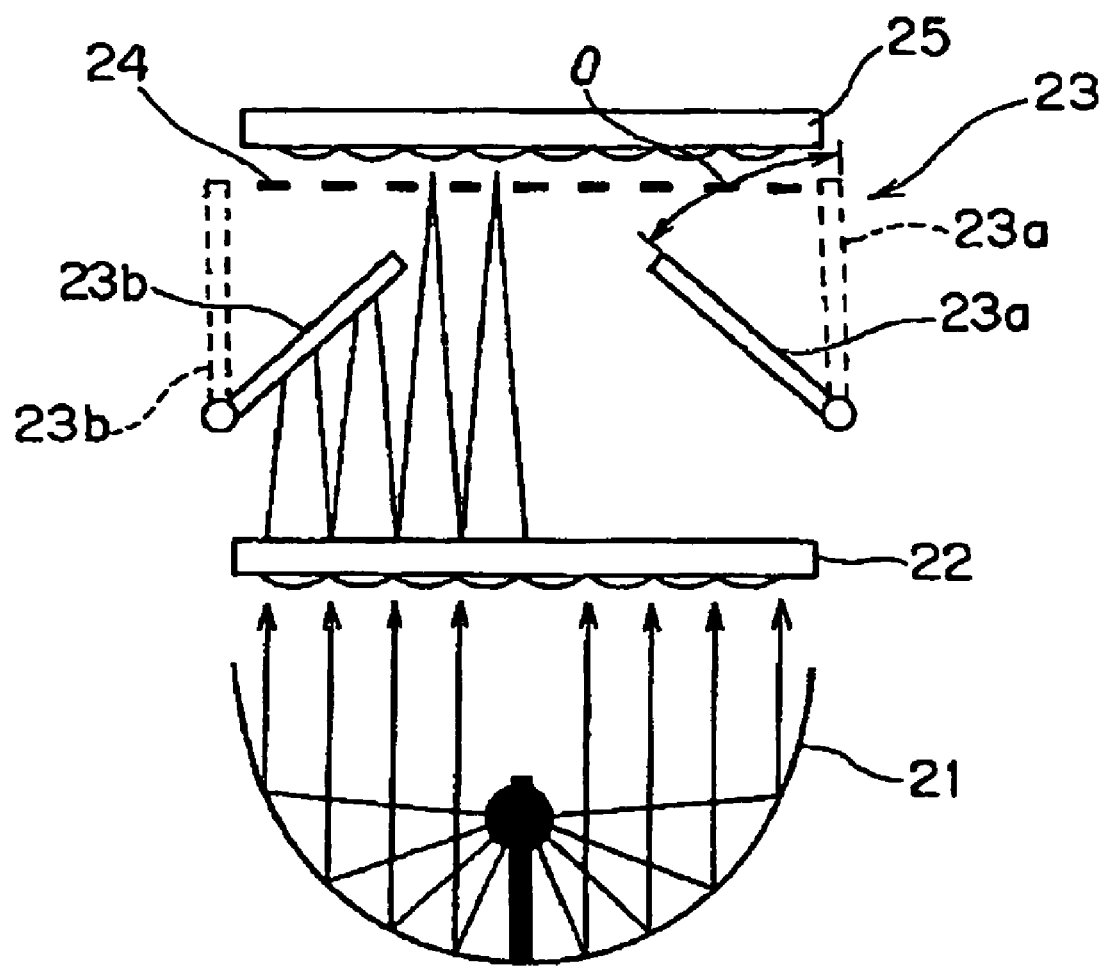
FIG. 3 is an illustration showing an open/close light shield provided on an optical system shown in FIG. 2.

FIG. 3 is an illustration of the structure and the function of the open/close light shield 23 of the illuminator optical system 20. As clearly shown in the illustration, the open/close light shield 23 has a pair of rectangular light-shielding plates 23a and 23b, the light-shielding plates 23a and 23b being rotatable so that the distal ends thereof are located on the side of the second fly's eye lens 25. The light-shielding plates 23a and 23b are synchronously opened/closed at an equal angle θ, so that the optical path of the illumination light from the first fly's eye lens 22 to the second fly's eye lens 25 is partially blocked from the side adjacent to a conjugate position of the light-source lamp 21. Accordingly, the illumination light from the light-source lamp 21 can be attenuated to 50% at the maximum. The rotation angle of the light-shielding plates 23a and 23b can be changed stepwise by a step motor provided on the open/close drive device 29 (see FIG. 2). In the figure, the solid line represents a maximum closed position and the dotted line represents an open position. At the maximum closed position, only the illumination lights from the first fly's eye lens 22 on the central side are incident on the second fly's eye lens 25 and the outside lights are blocked by the light-shielding plates 23a and 23b. Incidentally, anti-reflection processing may be conducted on the surface of the light-shielding plates 23a and 23b to prevent the blocked light from being reflected toward the first fly's eye lens 22. For instance, an anti-reflection film is formed on the surface of the light-shielding plates 23a and 23b or the surface of the light-shielding plates 23a and 23b is applied with rough texture to prevent the reflection of the incident light.

Figure 4:
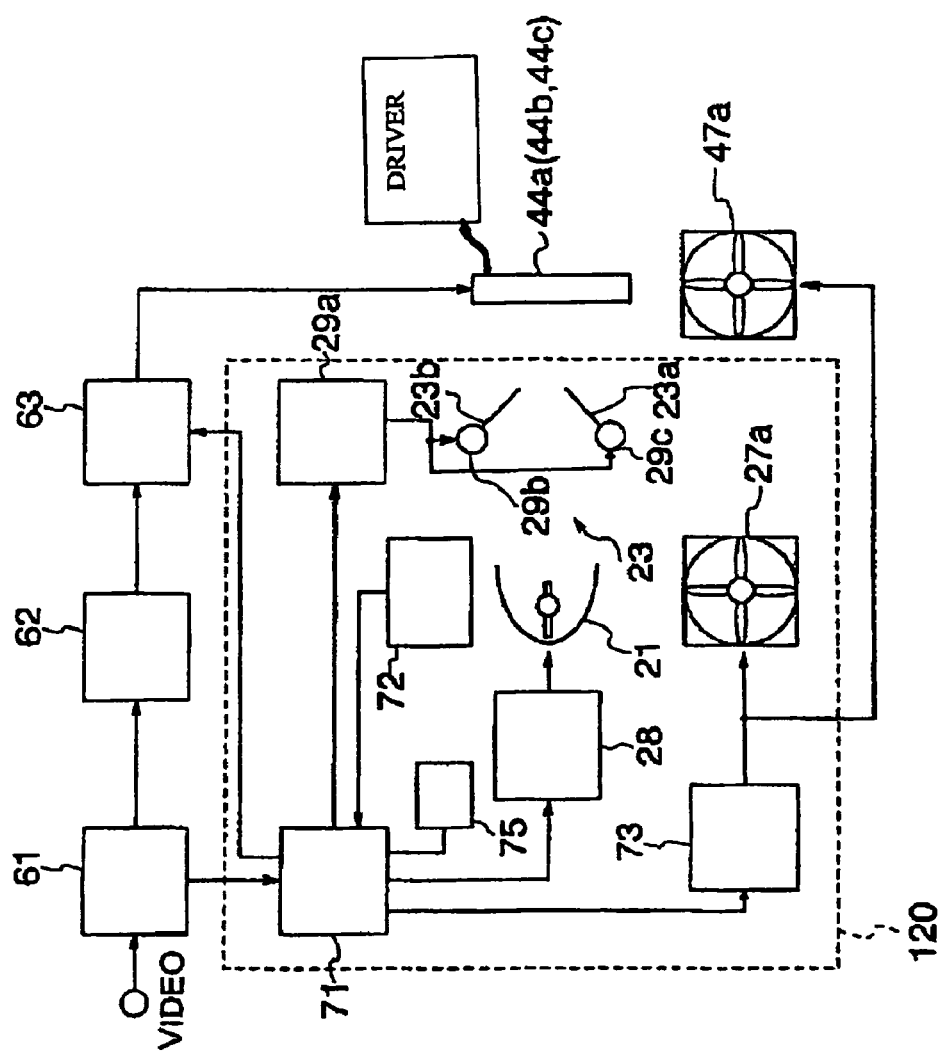
FIG. 4 is a block diagram schematically showing a circuit arrangement of a control system.

FIG. 4 is a block diagram schematically showing the circuit arrangement of the control system installed in the projector 10. A video signal from a video input terminal is processed as desired by passing through an image-analyzing circuit 61, a resizing circuit 62 and a gain-adjusting circuit 63 to be used for driving the light valve 44a (44b, 44c). The image-analyzing circuit 61 extracts luminance information related to luminance distribution and the like of the image from the inputted video signal and outputs the information to a CPU 71 provided to an illuminator 120. Specifically, the image-analyzing circuit 61 can be constructed by a peak-holding circuit that is reset for respective frames, where the maximum luminance value is outputted for the respective images. The resizing circuit 62 is a resolution-converting circuit that converts the resolution of the inputted image corresponding to the number of pixel of the light valve 44a (44b, 44c). The gain-adjusting circuit 63 adjusts the luminance signal in accordance with the intensity of the illumination light irradiated by the illuminator 120, which cooperates with the illuminator 120 to enhance the contrast of the projected image as desired.

In the illuminator 120, the CPU 71, i.e. the controller, drives the lamp driver 28 and a motor-driving circuit 29a based on the luminance information obtained by the image-analyzing circuit 61 to adjust the intensity of the illumination light in accordance with the luminance distribution for the respective projected images. The lamp driver 28 has an emitting light volume controlling circuit as a light source driver, which adjusts the emitting light volume of the light-source lamp 21 at a desired value based on the command from the CPU 71. The motor-driving circuit 29a drives motors 29b and 29c provided on the respective light-shielding plates 23a and 23b to hold the light-shielding plates 23a and 23b at a designated open/close condition to adjust the intensity of the illumination light incident on the light valve 44a (44b, 44c) at a desired value. The motor-driving circuit 29a and the motors 29b and 29c constitute the open/close driving device 29 shown in FIG. 2.

A temperature sensor 72 monitors the temperature of the light-source lamp 21. The CPU 71 outputs a "cooling" command signal to a fan-driving circuit 73 based on the detected result of the temperature sensor 72 to drive a fan 27a provided in the air-cooling device 27. Specifically, when the temperature of the light-source lamp 21 exceeds a predetermined level, the rotation number of the fan 27a is increased to cool the light-source lamp 21. On the other hand, when the temperature of the light-source lamp 21 becomes below a predetermined level, the rotation number of the fan 27a is reduced. Incidentally, when the temperature of the light-source lamp 21 is lower than a predetermined lower limit, the CPU 71 may drive the light-source lamp 21 at a condition for increasing the illuminating light volume (i.e. heated condition). Accordingly, stable light of a desired luminance can be generated by the light-source lamp 21.

The fan-driving circuit 73 not only drives the fan 27a of the air-cooling device 27 but also drives a fan 47a of the air-cooling device 47. Accordingly, the light valves 44a to 44c and the surroundings can be appropriately cooled.

Below Table 1 shows an example of an allocation table stored in a storage 75 connected to the CPU 71. The allocation table represents the data showing the combination for illuminating the light valve 44a (44b, 44c) with a desired light volume, which is a basis for calculating the command signal to be outputted to the lamp driver 28 and the motor-driving circuit 29a. Specifically, light-attenuation rate achieved by the combination of illuminating light volume SI (relative intensity when the maximum luminance is 100%) of the light-source lamp 21 and the rotation angle θ of the light-shielding plates 23a and 23b provided on the open/close light shield 23 is stored in the table. The rotation angle θ is referred to as a light-shielding parameter and relative transmissivity when the maximum transmissivity is 100%, i.e. the light-attenuation rate is allocated to the respective light-shielding parameters.

TABLE 1

| LIGHT-SHIELDING PLATE | | LAMP EMITTING LIGHT VOLUME SI | | | | | | | | | | | | |
|---|---|---|---|---|---|---|---|---|---|---|---|---|---|---|
| ANGLE θ | LIGHT-SHIELDING RATE | 100% | 98% | 95% | 93% | 90% | 88% | 85% | 83% | 80% | 78% | 75% | 73% | 70% |
| 0° | 100% | 100% | 98% | 95% | 93% | 90% | 88% | 85% | 83% | 80% | 78% | 75% | 73% | 70% |
| 2° | 100% | 100% | 98% | 95% | 93% | 90% | 88% | 85% | 83% | 80% | 78% | 75% | 73% | 70% |
| 4° | 100% | 100% | 97% | 95% | 92% | 90% | 87% | 85% | 82% | 80% | 77% | 75% | 72% | 70% |
| 6° | 98% | 98% | 95% | 93% | 90% | 88% | 86% | 83% | 81% | 78% | 76% | 73% | 71% | 68% |
| 8° | 95% | 95% | 93% | 90% | 88% | 86% | 83% | 81% | 79% | 76% | 74% | 71% | 69% | 67% |
| 10° | 94% | 94% | 92% | 89% | 87% | 85% | 82% | 80% | 78% | 75% | 73% | 71% | 68% | 66% |
| 12° | 94% | 94% | 92% | 89% | 87% | 85% | 82% | 80% | 78% | 75% | 73% | 71% | 68% | 66% |
| 14° | 94% | 94% | 92% | 89% | 87% | 85% | 82% | 80% | 78% | 75% | 73% | 71% | 68% | 66% |
| 16° | 92% | 92% | 90% | 88% | 85% | 83% | 81% | 78% | 76% | 74% | 71% | 69% | 67% | 65% |
| 18° | 88% | 88% | 86% | 84% | 82% | 80% | 77% | 75% | 73% | 71% | 69% | 66% | 64% | 62% |
| 20° | 85% | 85% | 83% | 81% | 78% | 76% | 74% | 72% | 70% | 68% | 66% | 64% | 61% | 59% |
| 22° | 84% | 84% | 82% | 80% | 77% | 75% | 73% | 71% | 69% | 67% | 65% | 63% | 61% | 59% |
| 24° | 84% | 84% | 81% | 79% | 77% | 75% | 73% | 71% | 69% | 67% | 65% | 63% | 61% | 59% |
| 26° | 82% | 82% | 80% | 78% | 76% | 74% | 72% | 69% | 67% | 65% | 63% | 61% | 59% | 57% |
| 28° | 78% | 78% | 76% | 74% | 72% | 70% | 68% | 66% | 64% | 62% | 60% | 58% | 56% | 54% |
| 30° | 72% | 72% | 71% | 69% | 67% | 65% | 63% | 61% | 60% | 58% | 56% | 54% | 52% | 51% |
| 32° | 68% | 68% | 66% | 64% | 63% | 61% | 59% | 58% | 56% | 54% | 53% | 51% | 49% | 48% |
| 34° | 66% | 66% | 65% | 63% | 61% | 60% | 58% | 56% | 55% | 53% | 51% | 50% | 48% | 46% |
| 36° | 66% | 66% | 64% | 63% | 61% | 59% | 58% | 56% | 54% | 53% | 51% | 49% | 48% | 46% |
| 38° | 63% | 63% | 62% | 60% | 59% | 57% | 56% | 54% | 52% | 51% | 49% | 48% | 46% | 44% |
| 40° | 58% | 58% | 57% | 55% | 54% | 53% | 51% | 50% | 48% | 47% | 45% | 44% | 42% | 41% |
| 42° | 50% | 50% | 49% | 48% | 46% | 45% | 44% | 43% | 41% | 40% | 39% | 38% | 36% | 35% |

In the allocation table, the light-attenuation rate ranges from 100% to 35%. In other words, the light valve 44a (44b, 44c) can be illuminated with an illuminating light volume substantially continuously attenuated to 35% of the maximum luminance of the light-source lamp 21. In other words, light-attenuation rate by far exceeding the adjustable intensity range of the illumination light solely by the light-source lamp 21 can be achieved, which means that the illuminating light volume of the light valves 44a to 44c can be changed over a wide range, thereby enhancing the contrast of the image projected by the projection lens 14 and, especially, enhancing the expressiveness at a dark part.

Further, when the light intensity is to be attenuated to 35% of the light source intensity solely by the open/close light shield 23, since the shielded 65% light is converted to heat, the heat radiation from the open/close light shield 23 has to be sufficiently secured, which is not easy. In contrast, in the present embodiment, since the emitting light volume of the light-source lamp 21 is reduced to 70% in advance, 35% of the light is converted to heat by the shield of the open/close light shield 23. Such amount of heat can be released only by providing a heat sink and a heat exchanger plate around the open/close light shield 23 without providing the additional air-cooling device 27 and the arrangement of the entire projector can be simplified.

Figure 5:
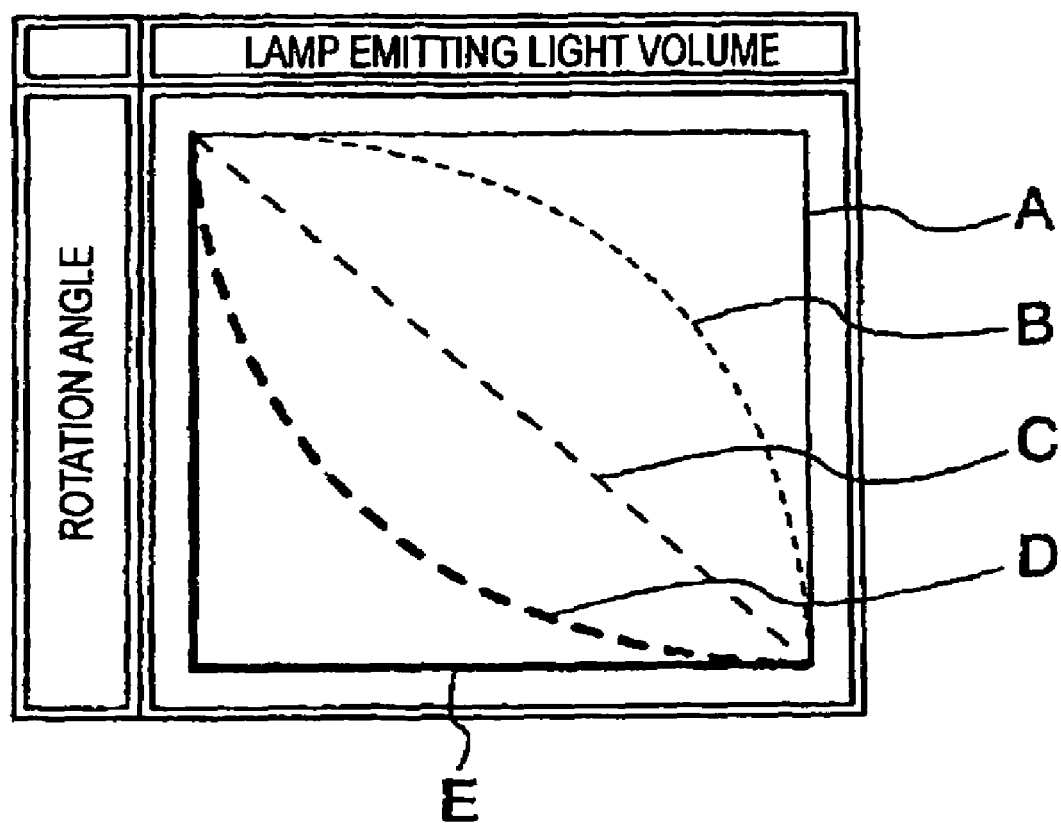
FIG. 5 is an illustration showing how an allocation table is used.

FIG. 5 is an illustration showing how the allocation table shown in Table 1 is used. A plurality of combinations of the rotation angle θ and the illuminating light volume SI can be found in the allocation table 1. Accordingly, in practice, one combination of the rotation angle θ and the illuminating light volume SI has to be selected according to the desired light-attenuation rate. In order to determine the combination, paths (i.e. operation modes) A to E schematically shown in FIG. 5 are used.

For instance, the path represented by the sign A gives priority to light-adjustment by the light-source lamp 21. When the light is to be adjusted according to the operation mode A, only the emitting light volume SI of the light-source lamp 21 is initially reduced by setting the rotation angle (of the open/close light shield 23) θ=0 and, when the illuminating light volume SI becomes the minimum (70%), the light-attenuation is taken over by adjusting the rotation angle θ to reduce the light volume of the illumination light to the lower limit (35%). The path represented by the sign C balances the light-adjustment by the light-source lamp 21 and the open/close light shield 23. When the light is attenuated by the operation mode C, the rotation angle θ of the open/close light shield 23 and the emitting light volume SI of the light-source lamp 21 are reduced by the same rate. The path represented by the sign E gives priority to the light-adjustment by the open/close light shield 23. When the light is adjusted by the operation mode E, at the initial stage, only the rotation angle θ of the open/close light shield 23 is gradually reduced while maintaining the emitting light volume SI of the light-source lamp 21 at the maximum, and, when the rotation angle reaches the minimum (50%), the light-attenuation is taken over by adjusting the light-source lamp 21 to attenuate the light volume of the illumination light to the lower limit (35%).

Incidentally, according to the operation mode B represented by the path B, the light is adjusted by the path intermediate between the path A and the path C. In other words, priority is relatively given to the light-adjustment by the light-source lamp 21. On the other hand, according to the operation mode D represented by the path D, the light is adjusted by the path intermediate between the path E and the path C. In other words, priority is relatively given to the light-adjustment by the open/close light shield 23.

Though users can designate which one of the operation modes A to E shown in FIG. 5 is used, the operation mode A that gives priority to the light-adjustment by the light-source lamp 21 is used in the initial setting of the projector 10. Specifically, the output of the light-source lamp 21 can be minimized by giving priority to the light-adjustment by the light-source lamp 21, so that the beat generation can be restrained to the minimum, thereby restraining the power waste. On the other hand, when the light-source lamp 21 is continuously used while the emitting light volume of the light-source lamp 21 is at the minimum value, though depending on the type and environment of the light-source lamp 21, the temperature of the light-source lamp 21 can become excessively low. When a light-source lamp of a specific type is used, the life span of the lamp is badly influenced or light-emitting condition can be unstable without being driven at a predetermined high-temperature range. In view of the above circumstances, when the temperature sensor 72 detects that the temperature of the light-source lamp 21 falls below a predetermined temperature, the operation mode can be switched to one of the operation modes B to E giving more priority to the open/close light shield 23, as well as restraining the cooling by the fan 27a. According to the above arrangement, the table corresponding to one of the paths A to E is selected in accordance with the temperature of the light-source lamp 21, thereby simultaneously achieving stable operation and heat reduction of the light-source lamp 21.

An example of the operation of the projector 10 according to the first embodiment will be described below. When a video signal is inputted to the projector 10 through a video input terminal, the image-analyzing circuit 61 detects the luminance peak value of the image and outputs the value to the CPU 71. The downstream resizing circuit 62 appropriately converts the resolution of the video signal to fit to the pixel number of the light valve 44a (44b, 44c). The gain-adjusting circuit 63 adjusts the luminance signal in the video signal based on the command by the CPU 71. The CPU 71 determines a gain adjustment on the basis of the luminance peak value of the image obtained by the image-analyzing circuit 61 and outputs the result to the gain-adjusting circuit 63. For instance, when the luminance peak value Ip of the image is 50% of the upper limit Imax of the luminance capable of being inputted to the projector 10, the gain-adjustment amount AG is doubled. In this case, the illuminating light volume of the light valve 44a (44b, 44c) has to be attenuated to 50% thereof, which is achieved by light-adjustment by the light-source lamp 21 and the open/close light shield 23. In other words, the CPU 71 selects which one of the combinations on the Table 1 is used to attenuate the light according to the operation mode selected among the operation modes A to E shown in FIG. 5, and outputs a command according to the contribution percentage of the light-source lamp 21 and the open/close light shield 23 to the lamp driver 28 and the motor-driving circuit 29a. The lamp driver 28 and the motor-driving circuit 29a are driven based on the command to set the illuminating light volume irradiated by the illuminator 120, i.e. the illuminating light volume of the light valve 44a (44b, 44c) at an appropriate value (50% in the above example). According to the above arrangement, when the image has low luminance peak value Ip, the illuminating light volume is attenuated to reproduce darker black, thereby achieving higher contrast in comparing with the white with the 100% illuminating light volume. For instance, when the peak value of the image luminance is lowered to 35%, an image having, by simple arithmetic, triple contrast can be displayed.

Figure 6:
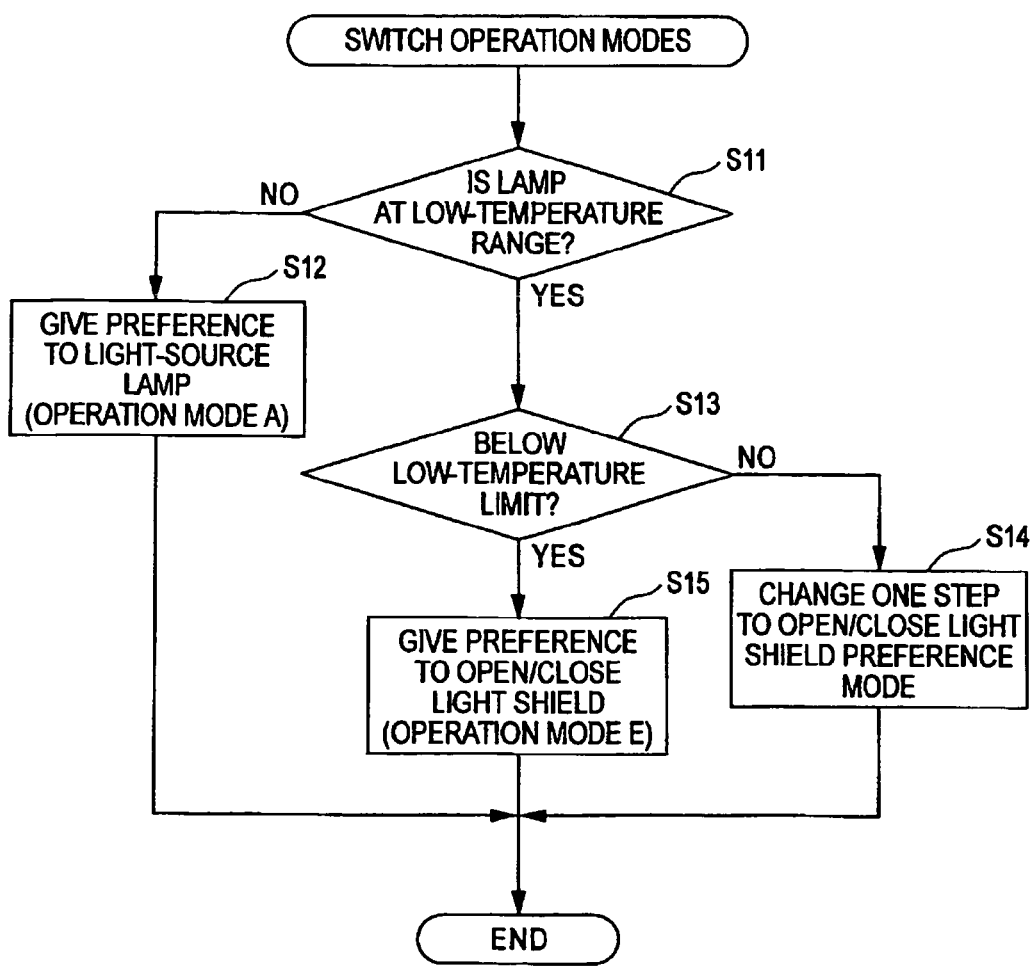
FIG. 6 is a flowchart showing how an operation mode is set.

FIG. 6 is a flowchart showing an example of setting of light-adjustment operation mode, which specifically shows how the CPU 71 works as a judging portion. Initially, based on the detection result of the temperature sensor 72, whether the light-source lamp 21 is operated below a predetermined temperature, i.e. low-temperature range, is determined (step S11). When judged "NO" in the step S11, basic operation mode A giving priority to light-adjustment by the light-source lamp 21 is set (step S12). On the contrary, when "YES" is judged in the step S11, whether the temperature of the light-source lamp 21 is below the lower limit or not is judged (step S13). When judged "NO" in the step S13, since the temperature of the light-source lamp 21 is relatively low and the operation may become unstable, the current operation mode is changed one step to the operation mode giving priority to light-adjustment by the open/close light shield 23. For instance, when the current setting is, the operation mode A shown in FIG. 5, the open/close light shield 23 is changed to the operation mode B partially using the open/close light shield 23 (step S14). On the other hand, when "YES" is judged in the step S13, since the light-source lamp 21 is completely low and is likely to become unstable, the current operation mode is switched to the operation mode E giving top priority to the light-adjustment by the open/close light shield 23 (step S15).

Second Embodiment An illuminator according to a second embodiment of the present invention will be described below. The illuminator of the second embodiment drives the open/close light shield 23 at six or less rotation angle stages. When the motors 29b and 29c provided on the open/close light shield 23 is constructed by a step motor, though the rotation angle of the light-shielding plate 23a and 23b can be precisely controlled, much cost is required for the motor. Specifically, in order to secure sufficient resolution of luminance modulation, the step angle of the step motor has to be set approximately at one degree or a mechanism such as a reduction gear has to be provided, which can be an obstacle for producing a small and inexpensive illuminator. Accordingly, in the present embodiment, the light-shielding plates 23a and 23b are directly driven by a relatively inexpensive step motor with the step angle of about ten degrees or more.

Following Table 2 is an allocation table partially extracted from the Table 1, with reference to which the arrangement in which the light-shielding plates 23a and 23b are driven by a unit of ten degrees will be described. In this case, since the light-adjustment by the open/close light shield 23 takes discreet values, the gap between the values are adjusted by continuous light-attenuation by the light-source lamp 21. In this arrangement, there is still left a freedom for selecting which one of the light-attenuation by the light-source lamp 21 and the light-attenuation by the open/close light shield 23 should be given priority, and the operation mode can be switched as in the operation mode switching shown in FIG. 6.

TABLE 2

| LIGHT-SHIELDING PLATE | | LAMP EMITTING LIGHT VOLUME SI | | | | | | | | | | | |
|---|---|---|---|---|---|---|---|---|---|---|---|---|---|
| ANGLE θ | LIGHT-SHIELDING RATE | 100% | 98% | 95% | 93% | 90% | 88% | 85% | 83% | 80% | 78% | 75% | 73% | 70% |
| 0° | 100% | 100% | 98% | 95% | 93% | 90% | 88% | 85% | 83% | 80% | 78% | 75% | 73% | 70% |
| 10° | 94% | 94% | 92% | 89% | 87% | 85% | 82% | 80% | 78% | 75% | 73% | 71% | 68% | 66% |
| 20° | 85% | 85% | 83% | 81% | 78% | 76% | 74% | 72% | 70% | 68% | 66% | 64% | 61% | 59% |

TABLE 2-continued

| LIGHT-SHIELDING PLATE | | LAMP EMITTING LIGHT VOLUME SI | | | | | | | | | | | |
|---|---|---|---|---|---|---|---|---|---|---|---|---|---|
| ANGLE θ | LIGHT-SHIELDING RATE | 100% | 98% | 95% | 93% | 90% | 88% | 85% | 83% | 80% | 78% | 75% | 73% | 70% |
| 30° | 72% | 72% | 71% | 69% | 67% | 65% | 63% | 61% | 60% | 58% | 56% | 54% | 52% | 51% |
| 40° | 58% | 58% | 57% | 55% | 54% | 53% | 51% | 50% | 48% | 47% | 45% | 44% | 42% | 41% |

Third Embodiment

An illuminator according to a third embodiment of the present invention will be described below. The illuminator of the third embodiment is a modification of the illuminator of the second embodiment.

Figure 7:
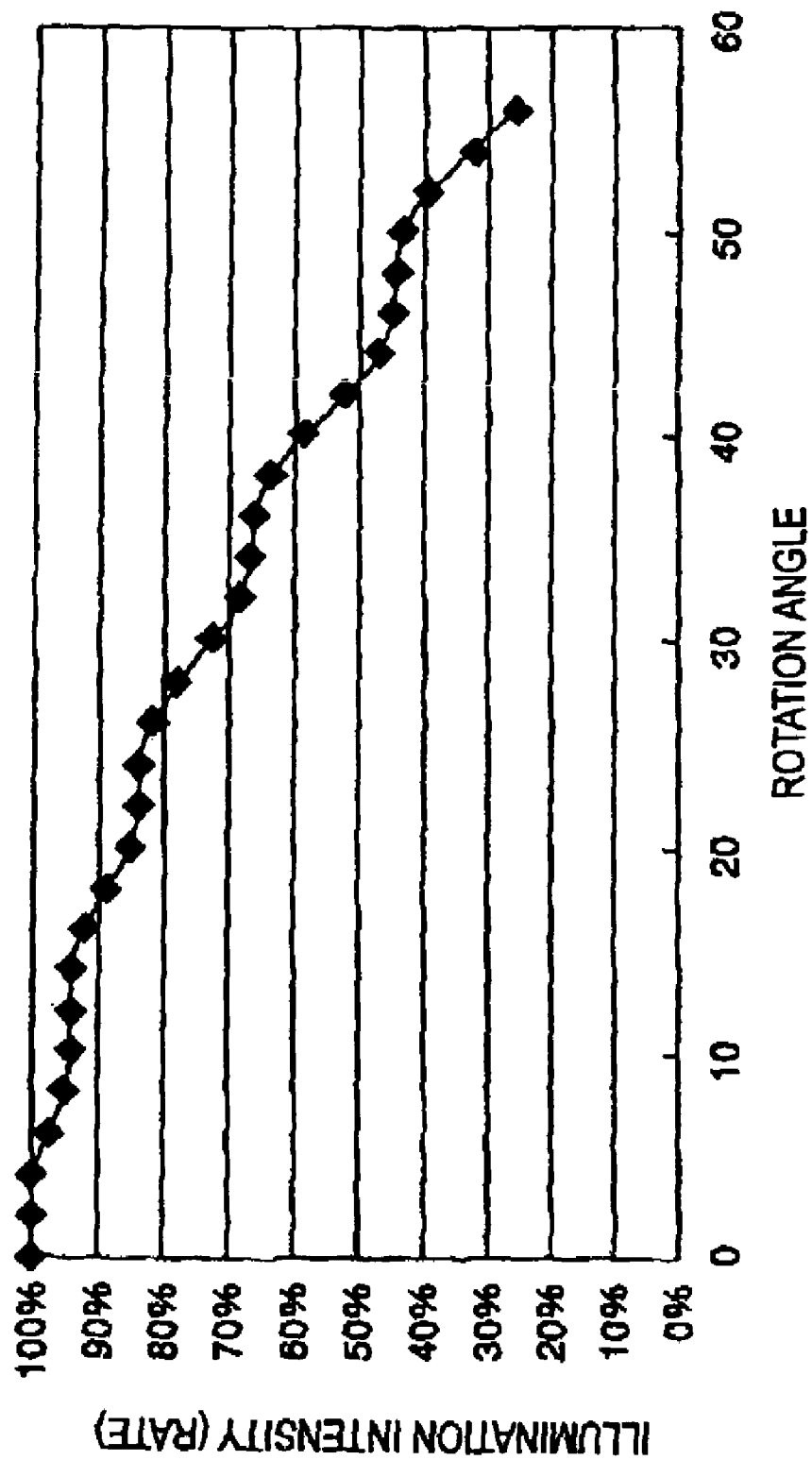
FIG. 7 is a graph showing a relationship between a rotation angle of a shield plate and illumination intensity.

FIG. 7 is a graph showing the relationship between each rotation angle of the light-shielding plates 23a and 23b of the open/close light shield 23 and the illumination intensity (adjusted amount) at the time. As clearly shown in the curve of the graph, the illumination intensity is not regularly decreased in accordance with the increase in the rotation angle, but the angle range with small fluctuation, i.e. inclination, of the illumination intensity and the angle range with great fluctuation are alternately repeated. In other words, the curve represents the light-attenuation rate changing stepwise in accordance with the rotation angle. This is because the light beam from the first fly's eye lens 22 passes through between the light-shielding plates 23a and 23b while converging for each of the component lenses (cells) (see FIG. 3). When each distal end of the light-shielding plates 23a and 23b passes between the component lenses, there is little fluctuation of the intensity of the illumination light. However, when the distal ends of the light-shielding plates 23a and 23b pass each front surface of the component lenses, the intensity of the illumination light is greatly fluctuated. The angle interval and fluctuation rate etc. change depending on the size and disposition of the light-shielding plates 23a and 23b but becomes constant once the light-shielding plates 23a and 23b are installed.

Using the characteristics shown in FIG. 7, the tolerance of the driving accuracy of the light-shielding plates 23a and 23b by the open/close drive device 29 can be set wide. Specifically, by setting each rotation angle of the light-shielding plates 23a and 23b within a range having gentle inclination, slight deviation of each rotation angle of the light-shielding plates 23a and 23b does not exert much influence on the light-attenuation rate. In other words, high-quality image can be projected by the highly accurate light-adjustment.

Following Table 3 is an allocation table partially extracted from the Table 1, which shows an arrangement for enlarging the angle tolerance of the light-shielding plates 23a and 23b. In this arrangement, the light-shielding plates 23a and 23b are rotated at a step angle of 11 degrees.

TABLE 3

| LIGHT-SHIELDING PLATE | | LAMP EMITTING LIGHT VOLUME SI | | | | | | | | | | | |
|---|---|---|---|---|---|---|---|---|---|---|---|---|---|
| ANGLE θ | LIGHT-SHIELDING RATE | 100% | 98% | 95% | 93% | 90% | 88% | 85% | 83% | 80% | 78% | 75% | 73% | 70% |
| 0° | 100% | 100% | 98% | 95% | 93% | 90% | 88% | 85% | 83% | 80% | 78% | 75% | 73% | 70% |
| 11° | 94% | 94% | 92% | 89% | 87% | 85% | 82% | 80% | 78% | 75% | 73% | 71% | 68% | 66% |
| 22° | 84% | 84% | 82% | 80% | 77% | 75% | 73% | 71% | 69% | 67% | 65% | 63% | 61% | 59% |
| 33° | 67% | 67% | 66% | 64% | 62% | 61% | 59% | 57% | 56% | 54% | 52% | 51% | 49% | 47% |

Fourth Embodiment An illuminator according to a fourth embodiment of the present invention will be described below. The illuminator according to the fourth embodiment uses a slit open/close light shield that is operated in two-stages, instead of the open/close light shield 23 shown in FIG. 3.

Figure 8:
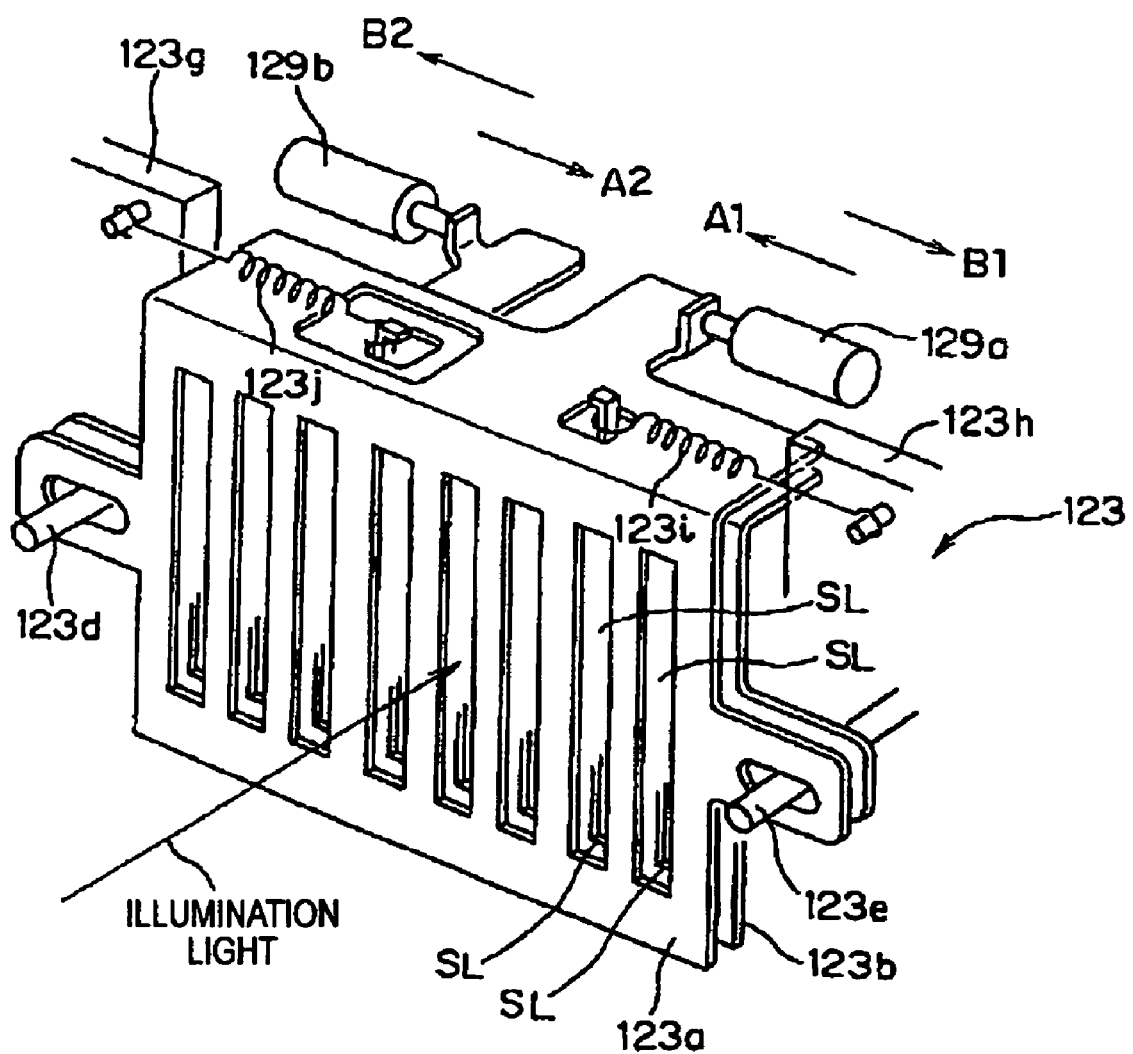
FIG. 8 is a perspective view showing a part of an illuminator according to a fourth embodiment of the present invention.

FIG. 8 is a perspective view showing a structure of an open/close light shield 123 installed in the illuminator according to the fourth embodiment The open/close light shield 123 has a pair of light-shielding masks, i.e. slit plates 123a and 123b respectively having eight slits (openings) SL, the relative position of the slit plates 123a and 123b being adjusted for on/off controlling of light transmission amount or light shield amount at two stages. Though the first slit plate 123a is movable in A1 and B1 directions being guided by a pair of guide pins 123d and 123e and the second slit plate 123b is movable in A2 and B2 directions being guided by the guide pins 123d and 123e, movable ranges of both of the slit plates 123a and 123b are restricted by a pair of stoppers 123g and 123h.

Though the first slit plate 123a is biased in B1 direction by a spring 123i connecting the slit plate 123a and the stopper 123h, the movement of the slit plate 123a is restricted by the stopper 123h to which the upper end of the slit plate 123a touches. The second slit plate 123b is biased in B2 direction by a spring 123j connecting the slit plate 123b and the stopper 123g, but the movement of the slit plate 123b is restricted by the stopper 123g to which the upper end of the slit plate 123b touches. A pair of solenoid actuators 129a and 129b are lens-stop drive means electromagnetically driven in accordance with a drive signal, which respectively drive the slit plates 123a and 123b in A1 and A2 directions against the springs 123i and 123j. Specifically, when the solenoid actuators 129a and 129b are OFF, both of the slit plates 123a and 123b are respectively moved in B1 and B2 directions so that the slits SL of the slit plates are approximately aligned, thereby directly transmitting 100% of the illumination light. On the other hand, when the solenoid actuators 129a and 129b are ON, both of the slit plates 123a and 123b are instantaneously moved respectively in A1 and A2 directions to cause position shift of the slits SL to attenuate the illumination light approximately to 70%. When the solenoid actuators 129a and 129b are OFF again, the slit plates 123a and 123b instantaneously return to the original positions so that the slits SL are approximately aligned, allowing direct transmission of 100% illumination light.

Figure 9:
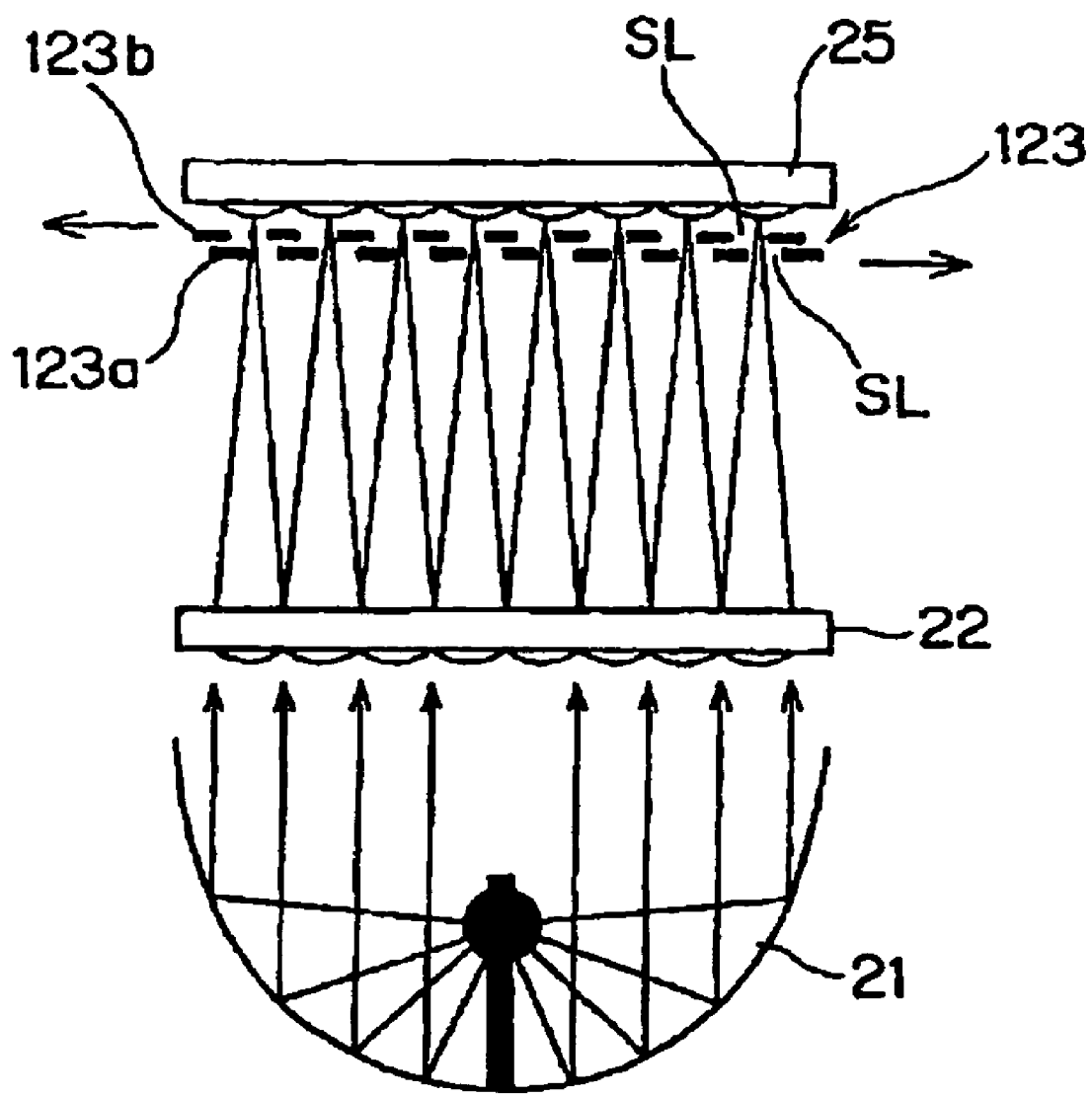
FIG. 9 is an illustration showing an arrangement of an open/close light shield shown in FIG. 8.

FIG. 9 is an illustration of the arrangement of the open/close light shield 123. As illustrated, the pair of slit plates 123a and 123b of the open/close light shield 123 are disposed at a position corresponding to the slit light shield 24 shown in FIG. 2 etc. Further, the slit plates 123a and 123b are disposed so that, when the solenoid actuators 129a and 129b shown in FIG. 8 are OFF, i.e. when the slits SL formed thereon are approximately aligned with a slight position shift and the optical path is not blocked, the slits SL are approximately opposed to the central position of the respective component lenses of the second fly's eye lens 25 (the condition shown in FIG. 9). Accordingly, when the slit plates 123a and 123b are positioned between the first and the second fly's eye lenses 22 and 25, 100% illumination light can be obtained.

Following Table 4 is an allocation table that can be used in the illuminator according to the fourth embodiment. In the present arrangement, since the open/close light shield 123 is controlled at two stages of ON and OFF, when the open/close light shield 123 is set ON to partially shield the light, the light-attenuation rate is set to 72%. Since the maximum light-attenuation rate of the light-source lamp 21 is 70%, maximum about 50% light-attenuation rate can be continuously obtained by the light-attenuation by the open/close light shield 123 and the light-attenuation by the light-source lamp 21.

Figure 10:
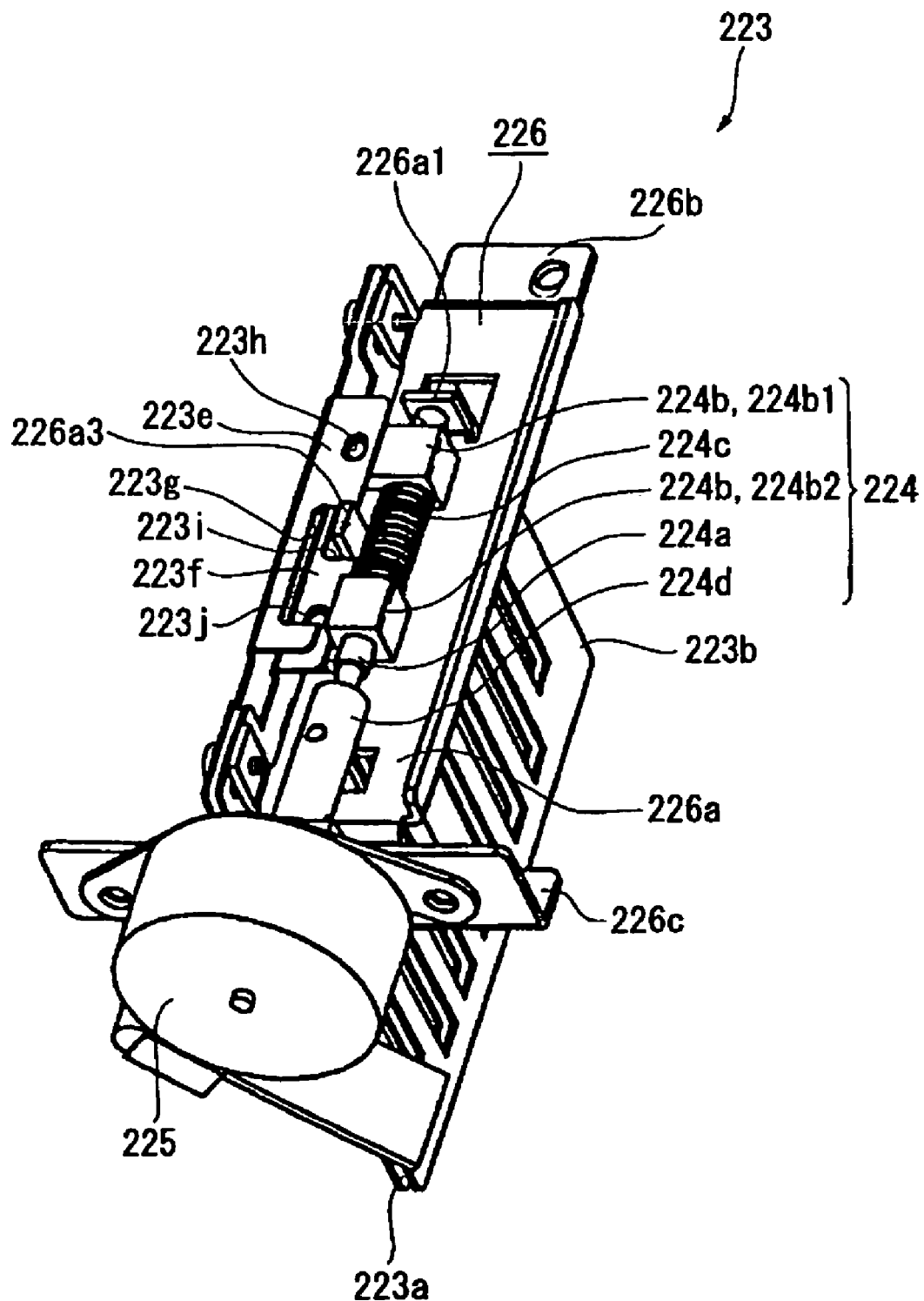
FIG. 10 is a perspective view showing a part of an illuminator according to a fifth embodiment of the present invention.
Figure 11:
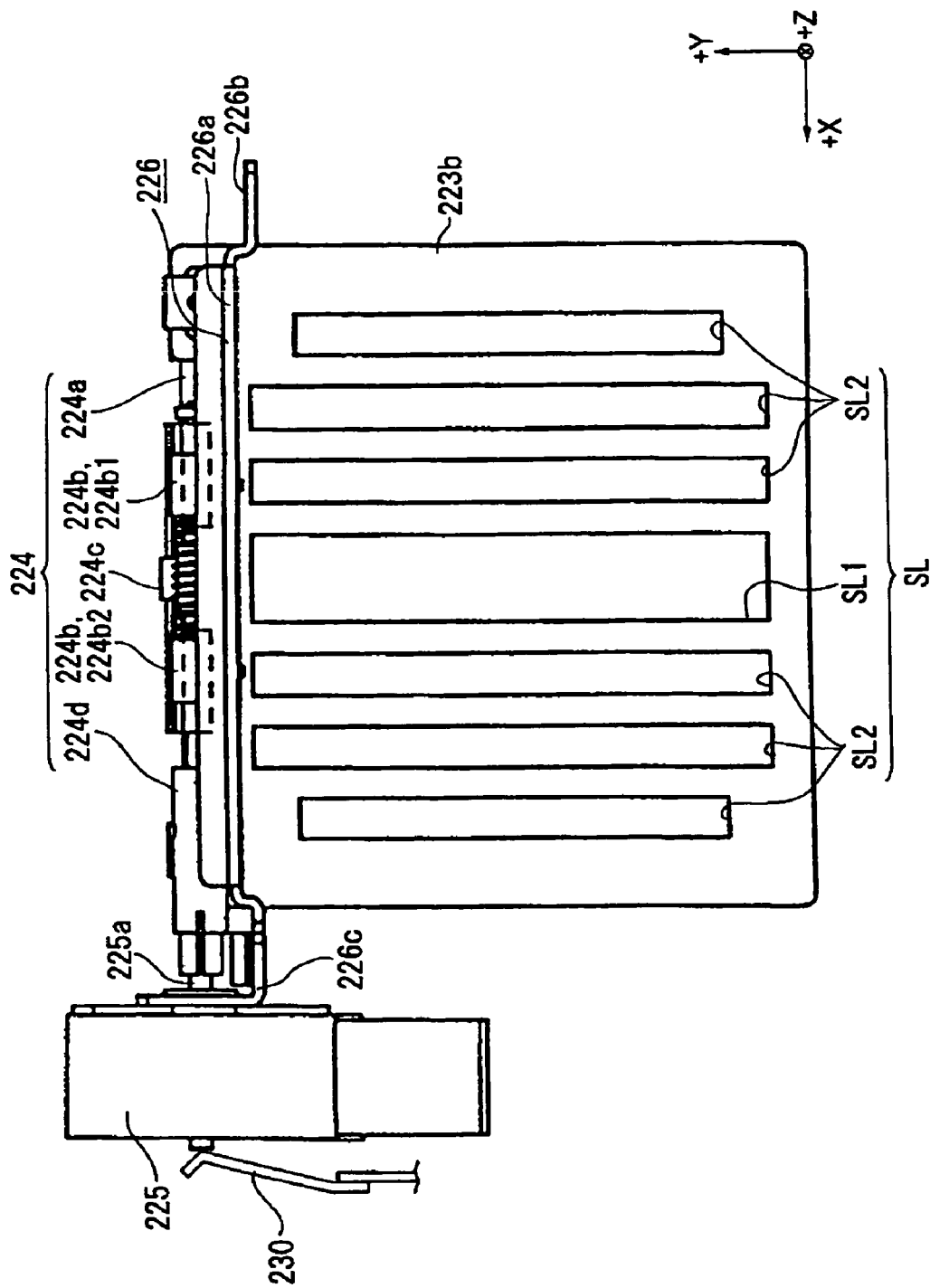
FIG. 11 is a front elevational view of the open/close light shield shown in FIG. 10.
Figure 12:
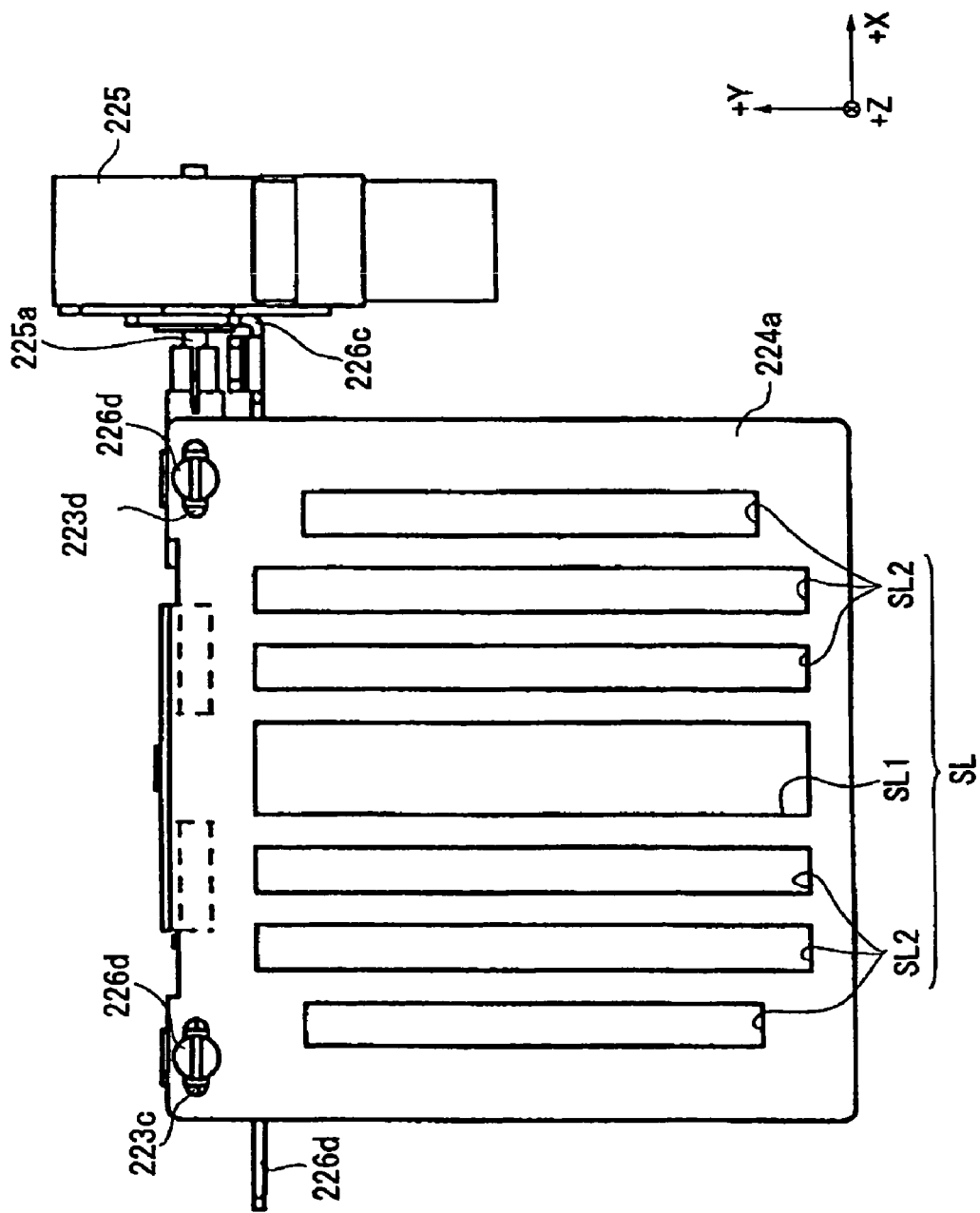
FIG. 12 is a rear elevational view of the open/close light shield shown in FIG. 10.
Figure 13:
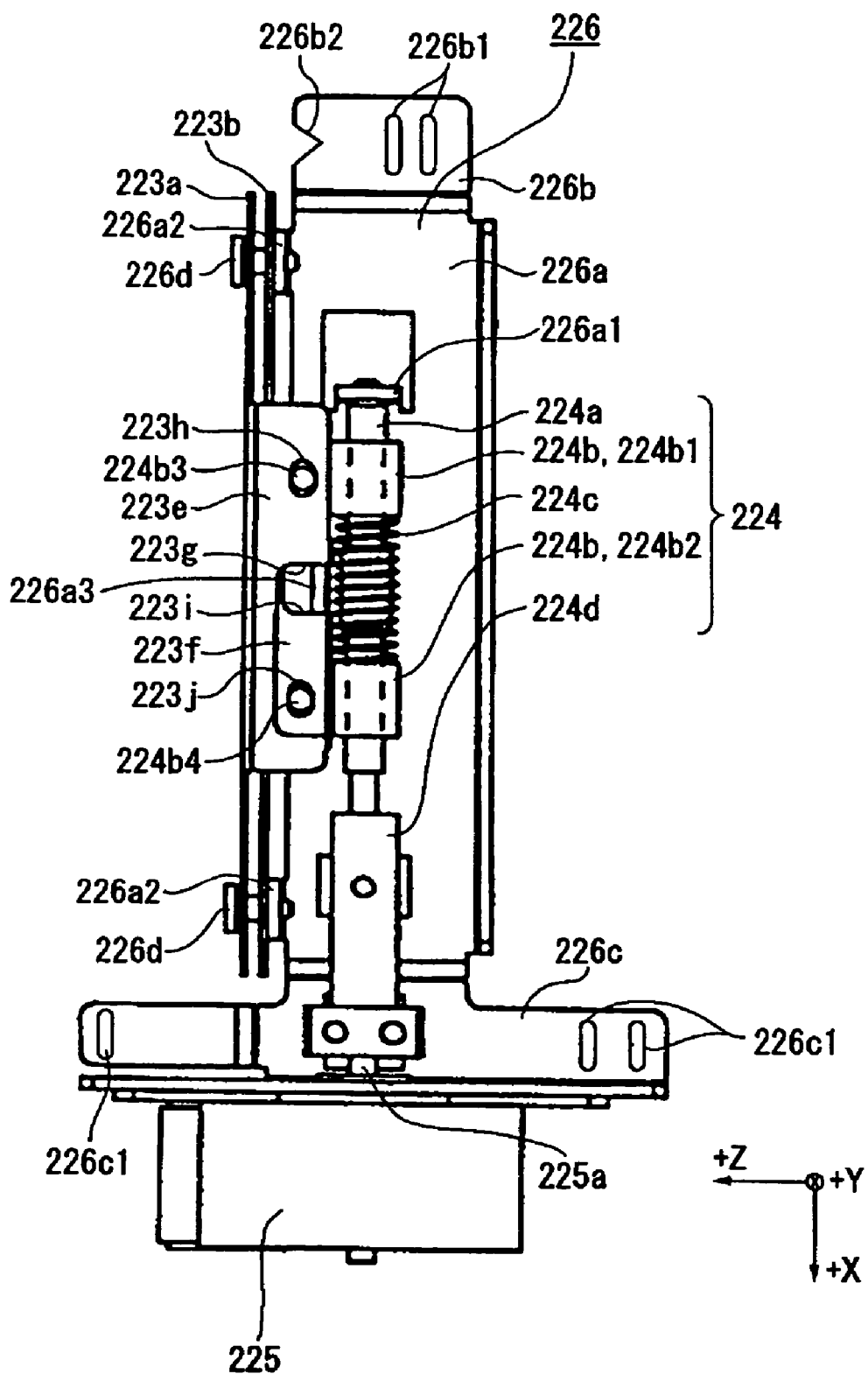
FIG. 13 is a plan view of the open/close light shield shown in FIG. 10.

FIG. 10 is a perspective view showing a structure of an open/close light shield 223 installed in the illuminator according to the fifth embodiment FIG. 11 is a front elevational view of the open/close light shield 223. FIG. 12 is a rear elevational view of the open/close light shield 223. FIG. 13 is a plan view of the open/close light shield 223. Incidentally, in FIGS. 11, 12 and 13, an XYZ orthogonal coordinates system is used for the description of the open/close light shield 223, where Z-axis is taken as the irradiation direction of the illumination light from the light-source lamp 21, X-axis is taken as the horizontal direction relative to the Z-axis, and Y-axis is taken as vertical direction relative to the Z-axis.

The open/close light shield 223 is positioned between the first fly's eye lens 22 and the second fly's eye lens 25 and is located near the conjugate position of the light-source lamp 21. As shown in FIGS. 10 to 13, the open/close light shield 223 has slit plates 223a and 223b as a light-shielding mask, a slit plate moving mechanism 224, i.e. a light-shielding mask moving mechanism, for achieving relative movement of the slit plates 223a and 223b, a pulse motor 225, i.e. a lens-stop drive mechanism, for driving the slit plate moving mechanism 224, and an attachment 226 for attaching the slit plates 223a, 223b, the slit plate moving mechanism 224 and the pulse motor 225 at a predetermined position in the casing 12.

As shown in FIGS. 11 and 12, the slit plates 223a and 223b are constructed by a plate member having rectangular profile viewed from the front side. Slits (openings) SL are formed on the slit plates 223a and 223b. The slit SL includes a slit SL1 located approximately at the center in X-axis direction and extending in Y direction, and three slits SL2 symmetrically arranged on both sides of the slit SL1. The slit SL1 is approximately twice as wide as the slit SL2. The slit SL2 located on the outside in X direction is shorter in height than the other slits SL2. The slits SL1 and SL2 constitute the slit SL, i.e. opening. In other words, the portion other than the slit SL has the function as the light-shielding portion according to the present invention.

As shown in FIG. 12, elongated holes 223c and 223d extending in X direction are formed at the two corners on the upper side of the slit plates 223a and 223b. Incidentally,

TABLE 4

| SLIT PLATE LIGHT-SHIELDING RATE | LAMP EMITTING LIGHT VOLUME SI | | | | | | | | | | | | |
|---|---|---|---|---|---|---|---|---|---|---|---|---|---|
| | 100% | 98% | 95% | 93% | 90% | 88% | 85% | 83% | 80% | 78% | 75% | 73% | 70% |
| 100% | 100% | 98% | 95% | 93% | 90% | 88% | 85% | 83% | 80% | 78% | 75% | 73% | 70% |
| 72% | 72% | 71% | 69% | 67% | 65% | 63% | 61% | 60% | 58% | 56% | 54% | 52% | 51% |

In the above fourth embodiment, since the open/close operation timing by the open/close light shield 123 can be kept constant, high-speed light-attenuation can be conducted, and rapid change in the luminance of the image contained in video signal can be rapidly handled. Further, since the light shield can be simply constructed by two-stage movement of an inexpensive and small actuator, the size, weight and production cost of the device can be lowered.

Fifth Embodiment An illuminator according to a fifth embodiment of the present invention will be described below. In the illuminator of the fifth embodiment, a stepwise-operating slit open/close light shield is used instead of the open/close light shield shown in FIG. 8.

though only the elongated holes 223c and 223d of the slit plate 223a are illustrated in FIG. 12, the elongated holes are also formed on the slit plate 223b in the same manner.

As shown in FIG. 10 or FIG. 13, projections 223e and 223f projecting from the upper end of the slit plates 223a and 223b in -Z direction are formed approximately at the center of the upper end of the slit plates 223a and 223b.

The projection 223e has a cut 223g extending from the distal end to the approximate center in Z direction and is formed in an approximately C-shaped viewed in planar direction. An engaging hole 223h to be engaged with the slit plate moving mechanism 224 is formed on the projecting portion of the C-shaped located in -X direction.

The projection 223*f* has approximately the same shape as the above-described projection 223*e*, which has a cut 223*i* and an engaging hole 223*j* located on the projection of the C-shape of the projection 223*e* projecting in +X direction.

As shown in FIG. 10, approximately central portion of the upper end of the slit plate 223*b* is recessed in −Y direction. In other words, the projection 223*e* is positioned on +Y side relative to the projection 223*f* to prevent mutual interference between the projection 223*e* and the projection 223*f*.

As shown in FIG. 10 or FIG. 13, the slit plate moving mechanism 224 includes a shaft 224*a* formed in a cylinder having an axis in X direction and rotatable around the axis, two sliders (movable portions) 224*b* engaged with the shaft 224*a* and moving in the axial direction of the shaft 224*a* in accordance with the rotation of the shaft 224*a*, a coil spring 224*c* (movable portion biasing member) positioned between the sliders 224*b*, and a joint 224*d* for connecting the shaft 224*a* with the motor shaft 225*a* (FIG. 13) of a pulse motor 225.

The shaft 224*a* is formed in a cylinder having a first end connected with the motor shaft 225*a* of the pulse motor 225 and a second end supported by the attachment 226. Though not illustrated, the shaft 224*a* has two screw grooves on the outer circumference between the both ends. The two screw grooves are mutually spaced apart, the screw groove located in −X direction side is constructed by a screw groove of a right-handed thread and the screw groove located in +X direction side is constructed by a screw groove of a left-handed thread.

The respective sliders 224*b* are formed in an approximately square pole having a female screw hole penetrating the opposing sides thereof which is to be screwed with the screw groove (not shown) of the shaft 224*a*. The slider 224*a*1 located in −X direction has a right-handed screw hole corresponding to the right-handed screw groove (not shown) of the shaft 224*a*. On the other hand, the slider 224*b*2 located in +X direction has a left-handed screw hole corresponding to the left-handed screw groove (not shown) of the shaft 224*a*.

Engaging pins 224*b*3 and 224*b*4 (FIG. 13) extending in +Z direction and further in +Y direction are formed on the sides in +Z direction of the respective sliders 224*b*. The engaging pins 224*b*3 and 224*b*4 are engaged with the engaging holes 223*h* and 223*j* of the slit plates 223*a* and 224*b*.

Though not illustrated, an engaging pin extending in −Y direction is formed on the sides in −Y direction of the respective sliders 224*b*, the engaging pin being engaged with an elongated hole (not shown) formed on the attachment 226 to guide the slider 224*b* during movement thereof.

The shaft 224*a* is inserted to the coil spring 224*c*, the coil spring having an end touching the side of the slider 224*a*1 in +X direction and the other end touching the side of the slider 224*b*2 in −X direction. In other words, the coil spring 224*c* biases the two sliders 224*a*1 and 224*b*2 to be away from each other in the axial direction of the shaft 224*a*.

The joint 224*d* connects the first end of the shaft 224*a* with the motor shaft 225*a* (FIG. 13) of the pulse motor 225. When the motor shaft 225*a* is rotated by driving the pulse motor 225, the joint 224*d* normally or reversely rotates the shaft 224*a* in accordance with the rotation of the motor shaft 225*a*.

The pulse motor 225 is a general-type pulse motor. The motor shaft 225*a* is rotated by applying a predetermined pulse voltage as a drive signal from the motor driving circuit 29*a* described in the first embodiment shown in FIG. 4. As shown in FIG. 11, a motor-shaft biasing member 230 for biasing the motor shaft 225*a* of the pulse motor 225 in −X direction is provided. Incidentally, though the pulse motor 225 is used as the optical lens stop in the present embodiment, a servomotor or the like may alternatively be used. The motor-shaft biasing member 230 may be a component having elasticity such as rubber as well as a biasing member such as a coil spring and a plate spring.

The attachment 226 has an approximately rectangular plate 226*a* extending in X direction and attachment components 226*b* and 226*c* integrally formed on both ends of the plate 226*a*.

A shaft support 226*a*1 projecting in +Y direction is formed around an end of the plate 226*a* in −X direction. The shaft support 226*a*1 rotatably supports the first end of the shaft 224*a*.

A slit plate support 226*a*2 projecting in +Y direction is formed around an end in X direction on the +Z side of the plate 226*a*. The slit plate support 226*a*2 has a hole (not shown) penetrating in Z direction. As shown in FIG. 12 or FIG. 13, a screw 226*d* is screwed to the hole (not shown) through the elongated holes 223*c* and 223*d* of the slit plates 223*a* and 223*b*, so that the slit plates 223*a* and 223*b* are supported by the slit plate support 226*a*2 in a manner rotatable in X direction.

A positioning projection 226*a*3 projecting in +Y direction is formed approximately at the center of the +Z side of the plate 226*a*. The positioning projection 226*a*3 is in contact with the cuts 223*g* and 223*i* of the slit plates 223*a* and 223*b* to define the initial position of the respective slits 223*a* and 223*b*. At the original position, the respective slit plates 223*a* and 223*b* is approximately aligned to mutually conceal the slit plates viewed in Z direction, where the illumination light is not attenuated.

Further, though not illustrated, an elongated hole extending in X direction to be engaged with an engaging pin (not shown) of the respective sliders 224*b* is formed on the plate 226*a*, the elongated hole restricting the moving direction of the respective sliders 224*b*.

As shown in FIG. 11, the attachment component 226*b* is a rectangular plate located on an end of the plate 226*a* in −X direction and bent in −Y direction in a stepped manner. As shown in FIG. 10 or FIG. 13, the attachment component 226*b* has two fixing holes 226*b*1 penetrating the top and bottom sides thereof and extending in X direction and a notch 226*b*2 having approximately V-shape on the side in −Z direction.

As shown in FIG. 10 or FIG. 12, the attachment component 226*c* has approximately L-shaped cross section extending in Z direction, and is integrally formed on the end of the plate 226*a* in +X direction to be bent in −Y direction in a stepped manner. Three fixing holes 226*c*1 penetrating the top and bottom sides of the attachment component 226*c* and extending in X direction are formed on the side of the attachment component 226*c* parallel to the X-Z plane. The pulse motor 225 is held and fixed on a side parallel to the Y-Z plane of the attachment component 226*c*. A hole (not shown) for allowing the motor shaft 225*a* to be projected toward the plate 226*a* when the pulse motor 225 is attached to the attachment component 226*c* is formed on the side of the attachment component 226*c* parallel to the Y-Z plane.

When the attachment 226 holding the components 223*a*, 223*b*, 224 and 225 at a predetermined position in the casing 12, a screw (not shown) is screwed to an optical component casing (not shown) provided in the casing 12 through the fixing holes 226*b*1 and 226*c*1. In order to adjust the position of the above-described attachment 226, a pointed tip of, for instance, a screwdriver is inserted to the notch 226*b*2 and the screwdriver is moved while the side surface of the screwdriver and an end of the notch 226b2 are in contact, so that the attachment position of the attachment 226 is adjusted in X direction.

Next, the operation of the open/close light shield 223 will be described below. Incidentally, reduction of the illumination intensity by the open/close light shield 223 will be mainly described.

When a predetermined pulse voltage as a drive signal from the motor driving circuit 29a shown in FIG. 4 described in the first embodiment is applied, the pulse motor 225 rotates the motor shaft 225a at a predetermined rotation angle. The motor shaft 225a is rotated counterclockwise in the present embodiment. The shaft 224a connected with the motor shaft 225a by the joint 224d is rotated by the predetermined counterclockwise rotation angle interlocking with the rotation of the motor shaft 225a.

When the shaft 224a is rotated, as shown in FIG. 13, the slider 224b1 screwed to the shaft 224a is moved in −X direction while displacing on the shaft 224a. Simultaneously, the slider 224b2 screwed to the shaft 224a is moved in +X direction while displacing on the shaft 224a.

Figure 14:
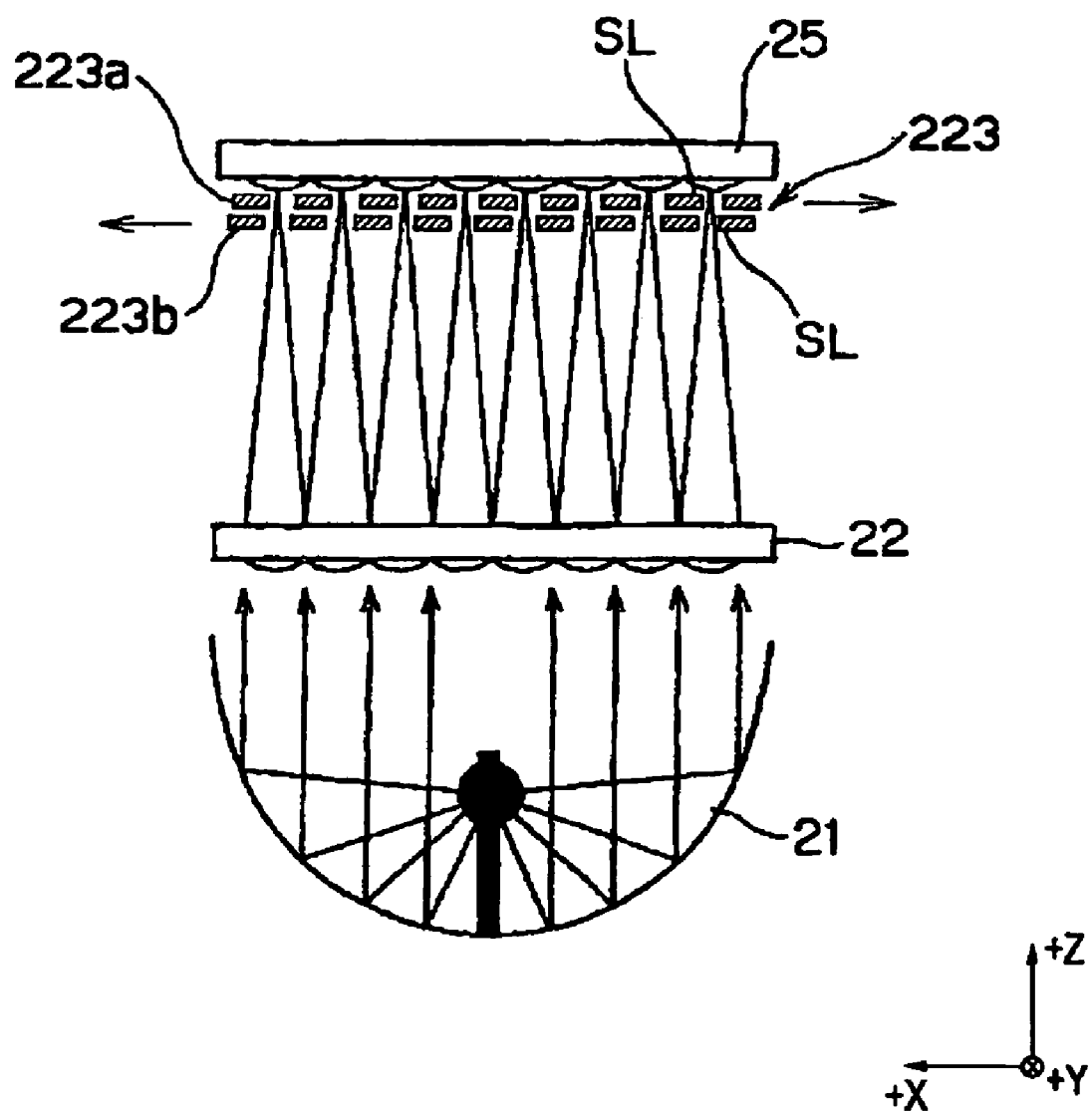
FIG. 14 is an illustration showing how the open/close light shield works.

In conjunction with the movement of the sliders 224b, as shown in FIG. 14, the slit plate 223a moves in −X direction and the slit plate 223b moves in +X direction from the original position. The movement of the slit plates 223a and 223b causes an intersection of the respective slits SL viewed in Z direction to decrease the illumination intensity.

Incidentally, the open/close movement of the open/close light shield 223 is conducted stepwise in the same manner as the open/close movement described in the first, second and third embodiments. In other words, the illumination intensity is decreased stepwise.

In the above fifth embodiment, the open/close light shield 223 has the slit plates 223a and 223b and the slit plate moving mechanism 224, the slit plate moving mechanism 224 slidably moving the slit plates 223a and 223b to change the illumination intensity, so that the light volume can be easily and rapidly adjusted with a simple structure.

The slit plate moving mechanism 224 has the shaft 224a and the two sliders 224a1 and 224b2, the shaft 224a being rotated to relatively displace the slit plates 223a and 223b, so that the structure of the slit plate moving mechanism 224 can be simplified. Further, by controlling the rotation angle of the shaft 224a, the illumination intensity can be changed stepwise, so that the light volume can be easily adjusted with high accuracy.

Since the slit plate moving mechanism 224 of the open/close light shield 223 has the coil spring 224c for biasing the two sliders 224a1 and 224b2 in a direction to be away from each other. Accordingly, the clearance between the sliders 224a1 and 224b2 and the screw groove of the shaft 224a can be eliminated and the position shift generated by the clearance can be avoided. Accordingly, the light volume can be accurately adjusted by the open/close light shield 223.

The open/close light shield 223 has the pulse motor 225 for rotating the shaft 224a. Accordingly, the shaft 224a can be driven by the single pulse motor 225 and the shaft 224a can be minutely rotated by a predetermined rotation angle by a predetermined pulse voltage as a drive signal. Therefore, the noise while driving the open/close light shield 223 can be restrained and the light volume can be adjusted with high accuracy.

Since the motor shaft 225a of the pulse motor 225 is biased in −X direction by the motor-shaft biasing member 230, the position shift of the motor shaft 225a can be prevented during the operation of the open/close light shield 223 and the light volume can be accurately adjusted by the open/close light shield 223.

Since the notch 226b2, the fixing hole 226b1 and the fixing hole 226c1 are formed on the attachment components 226b and 226c of the attachment 226, even when there is a design error in the open/close light shield 223 and/or the optical component casing (not shown) of the casing 12 and the illumination light cannot be shielded at a desired illumination intensity, the position of the attachment 226 can be adjusted. Accordingly, desired illumination intensity can be obtained by changing the position of the open/close light shield 223.

Since the open/close light shield 223 is disposed adjacent to the conjugate position of the light-source lamp 21, the light can be shielded near the conjugate position of the light-source lamp 21 by the open/close light shield 223. Accordingly, illumination unevenness of the light irradiated by the illuminator optical system 20 can be reduced and color unevenness of the image projected by the projection lens 14 can be restrained. Further, since the open/close light shield 223 is disposed between the first fly's eye lens 22 and the second fly's eye lens 25, it is not necessary to change the design of the illuminator optical system 20 even when the open/close light shield 223 is provided on the illuminator optical system 20. Accordingly, the open/close light shield 223 can be easily installed in a general-type illuminator optical system 20.

Though the present invention has been described with reference to the embodiments, the scope of the present invention is not restricted to the above embodiments. For instance, though the CPU 71 outputs the gain adjustment amount determined based on the luminance peak value of the image obtained by the image-analyzing circuit 61, the gain adjustment amount and light-attenuation rate corresponding thereto may be determined based on the average modulation rate of the image obtained by the image-analyzing circuit 61 and the average modulation rate on a predetermined area. Further, the gain adjustment amount may be determined based, not on the simple average modulation rate, but on histogrammed centroid thereof.

Though the open/close light shield 23 is operated by a stepping motor in the illuminator and the projector of the first embodiment etc., the open/close light shield 23 may be driven by the combination of a servomotor and a detector such as an encoder.

Though the open/close light shield 123 is driven by the two solenoid actuators 129a and 129b in the fourth embodiment, the slit plates 123a and 123b may be simultaneously moved by the combination of a single solenoid actuator and a mechanical link mechanism. Incidentally, other drive mechanism such as a piezoelectric element may be used instead of the solenoid actuators 129a and 129b.

Though the slit plate 223 of the fifth embodiment is composed of the two slit plates 223a and 223b, the slit plate 223 may have more than two slit plates. Further, though the slider 224b is composed of the two sliders 224b1 and 224b2, more than two sliders may be provided in accordance with the number of the slit plates.

Though the attachment 226 of the fifth embodiment has the notch 226b2, the fixing hole 226b1 and the fixing hole 226c1 formed on the attachment components 226b and 226c so that the position only in X direction can be adjusted, the position may also be adjusted in Y direction and/or Z direction.

Though the open/close light shield 223 of the fifth embodiment is located between the first fly's eye lens 22 and the second fly's eye lens 25 and near the conjugate position of the light-source lamp 21, such arrangement is not limiting. Specifically, it is only necessary for the open/close light shield 223 to be disposed near the conjugate position of the light-source lamp 21, and the open/close light shield 223 may be located on the downstream of the second fly's eye lens 25 or at the other position near the conjugate position of the light-source lamp 21.

Though the open/close light shields 23 and 123, i.e. optical lens stop, are used as the light shield, optical modulator such as a liquid crystal device for changing the light transmissivity may be used instead of the optical lens stop.

What is claimed is:

1. An illuminator comprising:
    an illuminating light source;
    a light source driver that adjusts an emitting light volume of the light source;
    a light shield that adjusts an intensity of an illumination light taken out from the light source; and
    a controller that drives the light source driver in combination with the light shield, the controller comprising:
        an allocation table storing information on a combination of the emitting light volume of the light source for a given illuminating light volume and a light shielding parameter corresponding to an adjustment amount by the light shield; and
        a judging portion that determines which combination in the allocation table is used.

2. The illuminator according to claim 1, wherein the light shield is an optical modulator that partially transmits a light beam irradiated by the light source.

3. The illuminator according to claim 1, wherein the light shield is an optical lens stop that partially shields a light beam irradiated by the light source.

4. The illuminator according to claim 3, the optical lens stop comprising:
    a plurality of light-shielding masks having an opening that transmits the illumination light from the light source and a light-shielding portion that shields a part of the illumination light from the light source; and
    a light-shielding mask moving mechanism that is capable of relatively moving the plurality of light-shielding masks so that the opening and the light-shielding portion are superposed in an irradiating direction of the illumination light from the light source.

5. The illuminator according to claim 4, wherein the light-shielding mask moving mechanism has a shaft extending in a first direction orthogonal to an illumination optical axis of the illumination light from the light source and rotating around an axis in the first direction, and a plurality of movable portions that moves in the first direction in accordance with the rotation of the shaft,
    wherein the plurality of movable portions are engaged with the plurality of light-shielding masks and moves in the first direction in accordance with the rotation of the shaft to cause relative movement of the plurality of light-shielding masks.

6. The illuminator according to claim 5, the optical lens stop further comprising a movable portion biasing member that biases the plurality of movable portions in the first direction to be away from each other.

7. The illuminator according to claim 3, further comprising a lens-stop driver that drives the optical lens stop.

8. The illuminator according to claim 7, wherein the lens-stop driver is a motor.

9. The illuminator according to claim 8, further comprising a motor-shaft biasing member that biases a motor shaft of the motor in an axial direction of the motor shaft.

10. The illuminator according to claim 7, wherein the lens-stop driver is driven by an electromagnet.

11. The illuminator according to claim 1, wherein the light shield changes a transmissive light volume in a staged manner.

12. The illuminator according to claim 1, wherein the light shield is driven in two stages to vary a transmissive light volume.

13. The illuminator according to claim 1, further comprising an attachment for attaching the light shield at a predetermined position relative to the light shield,
    wherein the attachment is capable of adjusting the position of the light shield within a plane orthogonal to an illumination optical axis of the illumination light from the light source.

14. The illuminator according to claim 1, wherein the light shield partially shields a light beam irradiated by the light source from a side near a conjugate position of the light source.

15. The illuminator according to claim 14, further comprising a light-beam separator that includes a light-beam separating element that separates the illumination light from the light source and a light condenser that condenses a plurality of light beams separated by the light-beam separating element,
    wherein the light shield is disposed between the light-beam separating element and the light condenser.

16. The illuminator according to claim 1, wherein the light source driver continuously changes the emitting light volume of the light source.

17. The illuminator according to claim 1, wherein the judging portion switches standards of judgment with regard to which combination in the allocation table is used based on the temperature of the light source.

18. The illuminator according to claim 1, wherein the light shield is an optical lens stop that partially shields the illumination light from the light source,
    wherein the controller drives the optical lens stop within range of a predetermined adjustment amount of six or less stages of the optical lens stop.

19. The illuminator according to claim 18, wherein the predetermined adjustment amount is set at a range having gentle inclination on a curve of a graph representing the light shielding parameter corresponding to a drive amount of the optical lens stop and an adjustment amount of the optical lens stop.

20. The illuminator according to claim 1, wherein the controller gives priority to a decrease in the emitting light volume of the light source by the light source driver over a decrease in the illumination light by the light shield.

21. The illuminator according to claim 1, further comprising a temperature sensor that measures the temperature of the light source,
    wherein the controller gives priority to a decrease in the illumination light by the light shield over a decrease in the emitting light volume of the light source by the light source driver when the temperature of the light source is below a predetermined temperature.

22. A projector comprising:
    an illuminator according to claim 1;
    an optical modulator illuminated by the illuminator; and
    a projection lens that projects an image on the optical modulator on an object.

23. A projector comprising:

an illuminator according to claim 1;

a plurality of optical modulators illuminated by the illuminator;

a combining optical system that combines images on the plurality of optical modulators; and a projection lens that projects the images on the plurality of optical modulators combined by the combining optical system on an object.

24. The illuminator according to claim 2, further comprising an optical modulator driver that drives the optical modulator.

* * * * *